US008498493B1

(12) United States Patent
Choudhary

(10) Patent No.: US 8,498,493 B1
(45) Date of Patent: Jul. 30, 2013

(54) DIRECTIONAL CROSS HAIR SEARCH SYSTEM AND METHOD FOR DETERMINING A PREFERRED MOTION VECTOR

(75) Inventor: Saif Choudhary, Santa Clara, CA (US)

(73) Assignee: Imagination Technologies Limited, Hertfordshire (GB)

( * ) Notice: Subject to any disclaimer, the term of this patent is extended or adjusted under 35 U.S.C. 154(b) by 1065 days.

(21) Appl. No.: 12/477,012

(22) Filed: Jun. 2, 2009

(51) Int. Cl.
*G06K 9/46* (2006.01)

(52) U.S. Cl.
USPC ........................................ 382/236; 375/240.16

(58) Field of Classification Search
USPC ........................................ 382/236; 375/240.16
See application file for complete search history.

(56) References Cited

U.S. PATENT DOCUMENTS

| 6,160,850 | A | 12/2000 | Chen et al. | |
|---|---|---|---|---|
| 6,418,166 | B1 | 7/2002 | Wu et al. | |
| 6,611,559 | B1* | 8/2003 | Shingo et al. | 375/240.16 |
| 7,720,155 | B2* | 5/2010 | Seo | 375/240.16 |
| 2005/0207494 | A1 | 9/2005 | Ahn et al. | |
| 2005/0265447 | A1 | 12/2005 | Park | |
| 2005/0265454 | A1* | 12/2005 | Muthukrishnan et al. | 375/240.16 |
| 2005/0276327 | A1 | 12/2005 | Lee et al. | |
| 2006/0018554 | A1* | 1/2006 | Tsai et al. | 382/232 |
| 2006/0045186 | A1 | 3/2006 | Koto et al. | |
| 2006/0120452 | A1 | 6/2006 | Li | |
| 2006/0133506 | A1 | 6/2006 | Dang | |
| 2006/0165183 | A1 | 7/2006 | Numajiri et al. | |
| 2006/0203912 | A1* | 9/2006 | Kodama | 375/240.16 |
| 2007/0064808 | A1 | 3/2007 | Ishii et al. | |
| 2007/0104379 | A1 | 5/2007 | Kim et al. | |
| 2007/0127579 | A1 | 6/2007 | Dumitras et al. | |
| 2007/0183504 | A1 | 8/2007 | Hoffman et al. | |
| 2007/0223588 | A1* | 9/2007 | Lee | 375/240.16 |
| 2007/0258521 | A1 | 11/2007 | Tsai et al. | |
| 2008/0004073 | A1* | 1/2008 | John et al. | 455/556.1 |
| 2008/0080617 | A1 | 4/2008 | Kodama | |
| 2008/0107175 | A1 | 5/2008 | Han et al. | |
| 2008/0126278 | A1 | 5/2008 | Bronstein et al. | |
| 2008/0181310 | A1* | 7/2008 | Choi et al. | 375/240.16 |
| 2009/0115909 | A1* | 5/2009 | Walls et al. | 348/699 |
| 2010/0014588 | A1* | 1/2010 | Nakazato et al. | 375/240.16 |

* cited by examiner

*Primary Examiner* — John Strege
(74) *Attorney, Agent, or Firm* — Marger Johnson & McCollom PC

(57) ABSTRACT

A system and method for determining a preferred motion vector is provided, which may be used to estimate motion in a series of video image frames. The system may include a video encoder having a motion vector selector. The motion vector selector may include a first generator to generate a cost associated with motion vectors in a first direction, a selector to set a cross over point corresponding to a lowest cost motion vector in the first direction, a direction indicator to sample a set of motion vectors about the cross over point to select a preferred direction, and a second generator to generate a cost associated with the motion vectors in the preferred direction. The method may include determining a final motion vector having the lowest cost within a search window.

4 Claims, 15 Drawing Sheets

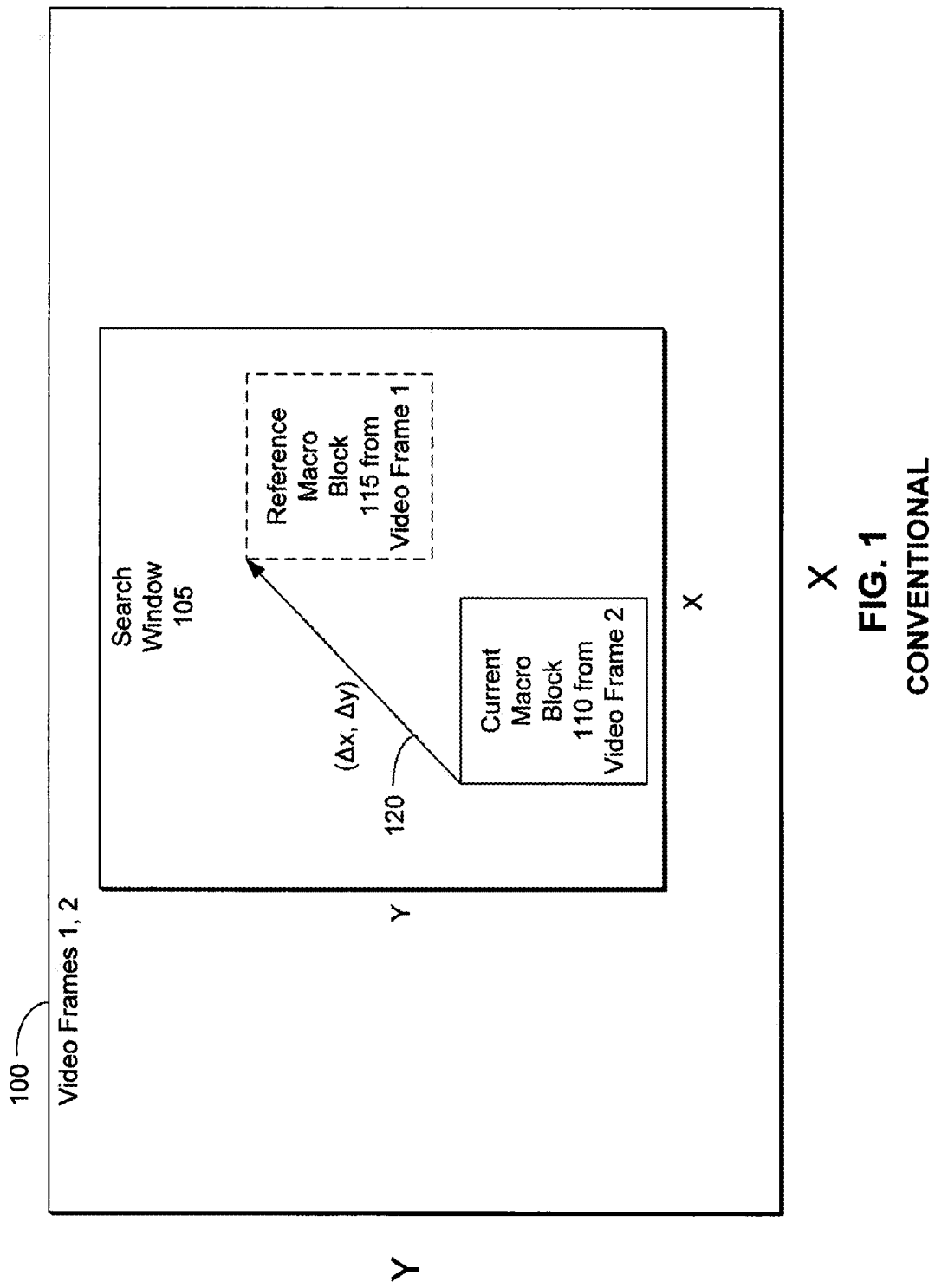
FIG. 1
CONVENTIONAL

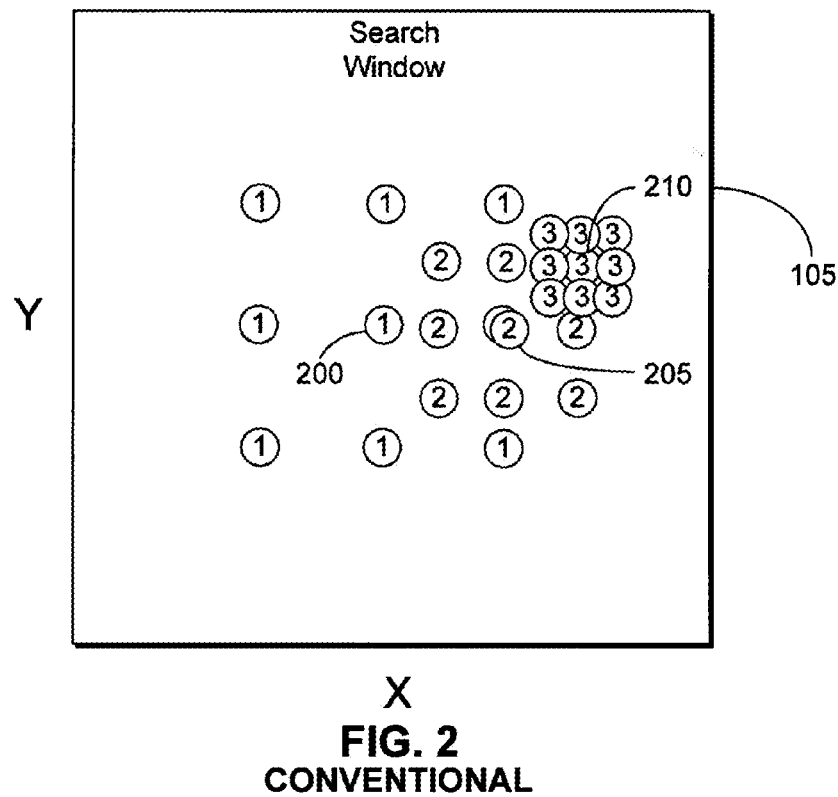
FIG. 2
CONVENTIONAL
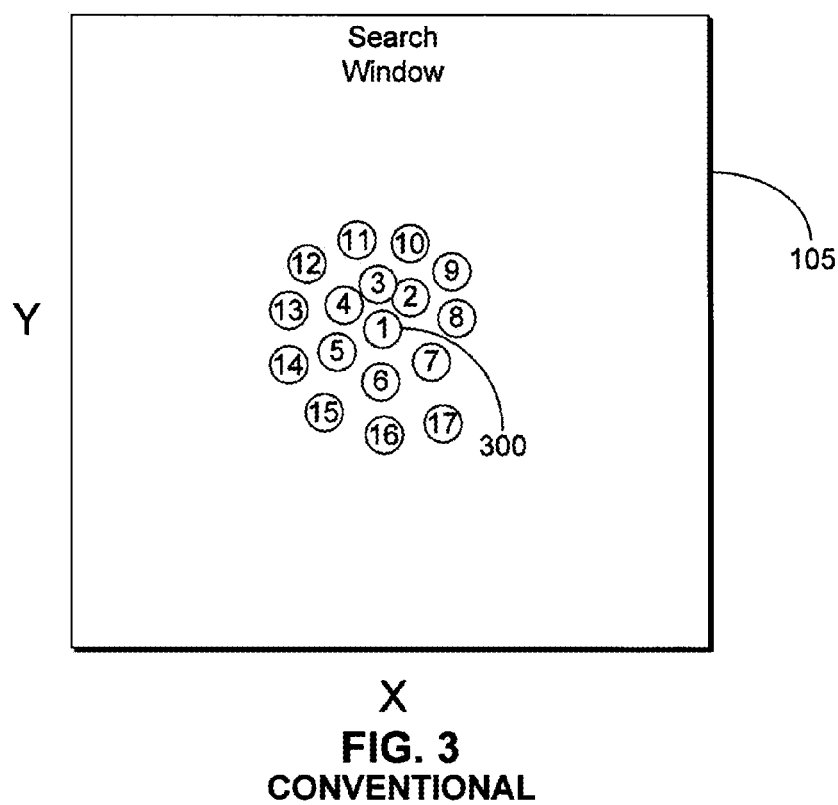
FIG. 3
CONVENTIONAL

DIRECTIONAL CROSS HAIR SEARCH SYSTEM AND METHOD FOR DETERMINING A PREFERRED MOTION VECTOR

TECHNICAL FIELD

This disclosure relates to video motion estimation, and, more particularly, to a system and method for determining a preferred motion vector.

BACKGROUND

Motion estimation is fundamental to a variety of video compression technologies. For example, video technologies such as moving picture expert group (MPEG) MPEG-1, MPEG-2, and MPEG-4H.264/MPEG-4 advanced video coding (AVC) (hereinafter referred to as H.264, the standard of which is expressly incorporated by reference herein) achieve compression through motion estimation and other techniques. A video sequence includes a series of image frames. In the series of frames, a current frame may be predicted from previously encoded frames known as reference frames. This is sometimes referred to as inter frame prediction.

Patterns corresponding to objects and background tend to "move" within the video frames to form corresponding objects or background from one video frame to the next. An object in the current frame may generally correspond to the same object in the reference frame, but may be in a different location. A video frame is usually divided into blocks or macroblocks. The size of the macroblock is typically 16×16 pixels, but can be any size, for example, down to 4×4 for motion estimation, according to the various standards. Each macroblock (or smaller block within each macroblock) in the current frame is compared to regions of the same size, which can also be referred to as macroblocks, in the reference frame to locate the best matching macroblock. In other words, video encoders use motion estimation to search the previously encoded frames to find the area that best matches the currently being coded macroblock of the current frame.

The matching of one macroblock with another is based on the output of a cost function. The macroblock that results in the least cost is the one that matches the closest to the current macroblock. Some examples of cost functions include a sum of absolute differences (SAD), a mean squared error (MSE), and a sum of absolute transformed differences (SATD), among others. To minimize computational costs, motion estimation may be performed in a predefined search window within a frame. However, larger motions within the video require larger search windows, and hence, lead to higher computational costs.

Motion estimation is an important function of any hybrid video encoder, and can affect many aspects of the encoder from cost, size, computation intensiveness, to compression ratios, etc. The H.264 standard allows video encoders to search a multiple number of previous frames using a search window size of +/−512 quarter pixels, for example, in each direction for high definition (HD) video sequences. This amounts to more than one million search locations per reference frame. Typically, video encoders perform motion estimation on full pixels first and then refine the best motion vector by searching the neighboring half or quarter pixels. This reduces the number of search locations to about 65,000. Even with only 65,000 search locations to evaluate, it is difficult and computationally expensive to implement the motion estimation.

During an exhaustive or full search, the cost function may be applied to the macroblock for each possible search location within the search window, and a motion vector may be associated with each cost and search location. Motion vectors representing the displacement of best matching macroblocks in the reference frame with respect to the corresponding macroblocks in the current frame may be determined. The motion vectors are used to compress video sequences by encoding the changes to an image from one frame to the next rather than encoding the image or frame. The encoders can use the motion vectors to identify the selected region in one of the previous frames and the error between the selected region and the actual macroblock in the current frame.

FIG. 1 is a schematic diagram showing video frame(s) 100 (i.e., video frames 1 and 2) including a search window 105 and macroblocks 110/115 according to a conventional motion estimation approach. A current macroblock 110 in a current video frame 2 is compared to a reference macroblock 115 in a reference video frame 1. After searching within the search window 105 for each possible location for the best matching macroblock 115 in the reference frame, a displacement between macroblocks 110 and the best matching macroblock 115 may be determined, which is represented by a motion vector 120. This determination can be made by exhaustively comparing the cost function of each possible motion vector associated with each of the search locations in the search window. Consequently, the current macroblock 110 is encoded as the motion vector 120 in view of the best matching macroblock 115 in the reference frame after comparing the results of the cost functions. The motion vector 120 includes a horizontal ($\Delta x$) component and a vertical component ($\Delta y$). The position of the current macroblock 110 has in essence shifted from the position of the reference macroblock 115. Performing a full search of the search window 105 is very computationally expensive, either in resources or time or both.

FIG. 2 is a schematic diagram showing a conventional approach to searching within search window 105 that is an alternative to the full search. A number of positions (search locations) around a center 200 are tested and the position of minimum distortion, or in other words, having the least cost, becomes the center of the next stage. For example, eight search locations around the center 200, and the center position 200 itself, are initially tested, indicated by the circled numbers 1. The search location yielding the lowest cost of the eight initial search locations is selected as the next center 205. Next, eight new locations around the new center 205, and the new center 205 itself, are tested, indicated by the circled numbers 2. The area covered by the second set of search locations is less than the first set because each new set is a refinement of the previous search. The search location yielding the lowest cost is selected as the next center 210. The method can continue until the search converges on a single search location. Such a search is often referred to as a "square" search or a "three step search" as described, for example, in U.S. Pat. Publication 2005/0207494. A variation on this type of search includes a "diamond" search, as described for example in U.S. Pat. Publication 2006/0203912.

FIG. 3 is a schematic diagram showing another conventional approach to searching within search window 105. The search begins from a center location 300 in the search window 105 and expands in a spiral pattern. The expansion can increment gradually, thereby providing an exhaustive search of the search locations in search window 105. Alternatively, the spiral search can have increasing distances from the center location 300. Such a search is described, for example, in U.S. Pat. No. 6,418,166 to Shou-jen.

A full or exhaustive search of all possible search locations, although accurate in finding the best locations of the macroblocks and providing good video quality, is nevertheless time-consuming and computationally expensive. Other conventional searches such as the square or spiral search discussed above may require fewer searches than a full search, because a partial search is performed as opposed to a full search. But the resulting video quality associated with these searches is degraded. Further, video sequences having larger motions require larger search windows; and the larger the search window, the more expensive the process of motion estimation becomes. Embodiments of the invention address these and other limitations in the prior art.

BRIEF DESCRIPTION OF THE DRAWINGS

FIG. 1 is a block diagram showing video frames including a search window and macroblocks according to a conventional motion estimation approach.

FIG. 2 is a block diagram showing a conventional approach to searching within the search window that is an alternative to the full search.

FIG. 3 is a block diagram showing another conventional approach to searching within the search window.

DETAILED DESCRIPTION

Figure 4:
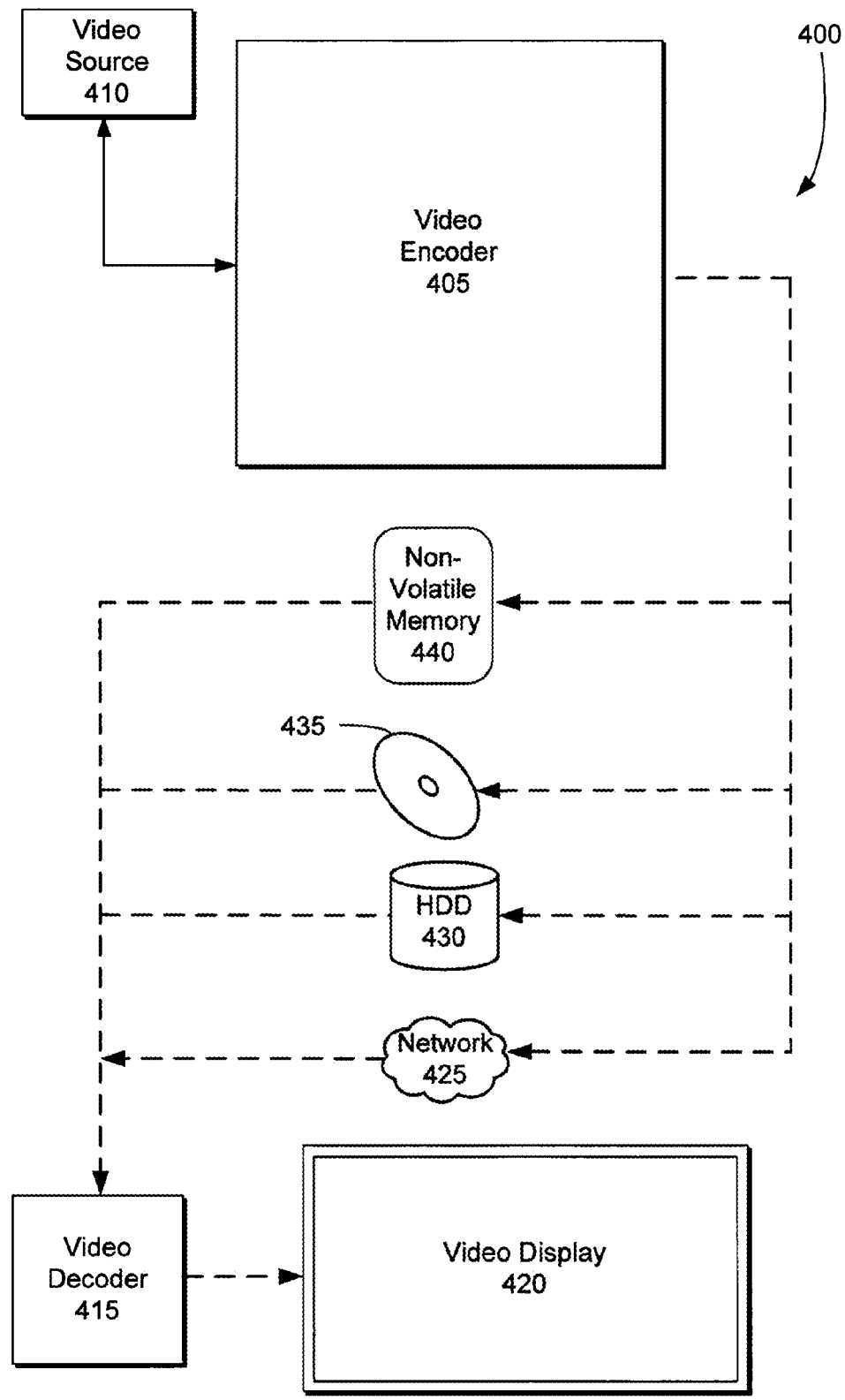
FIG. 4 is a block diagram showing an example video system according to embodiments of the invention.
Figure 5:
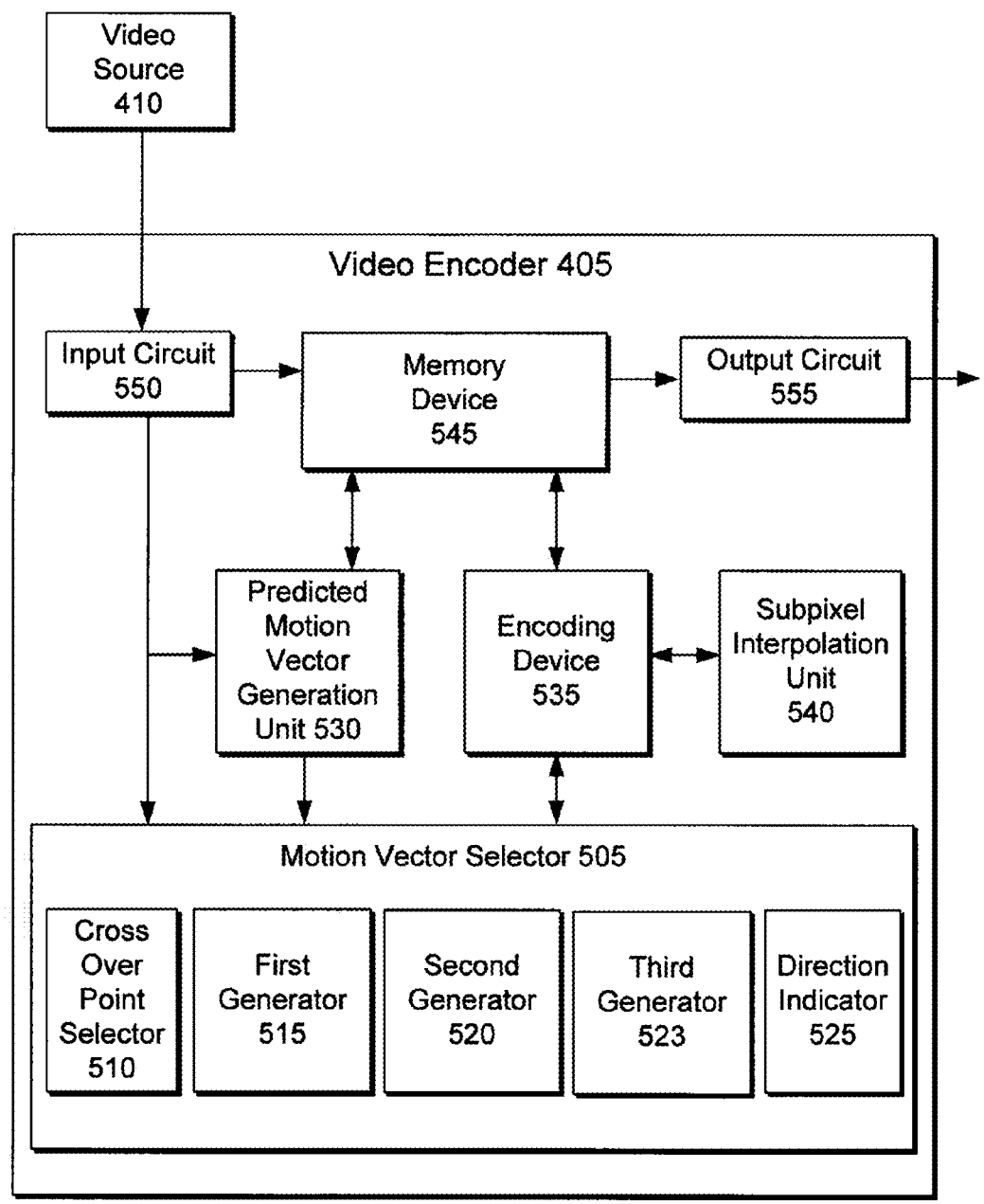
FIG. 5 is a block diagram showing aspects of the video encoder of FIG. 4.
Figure 6:
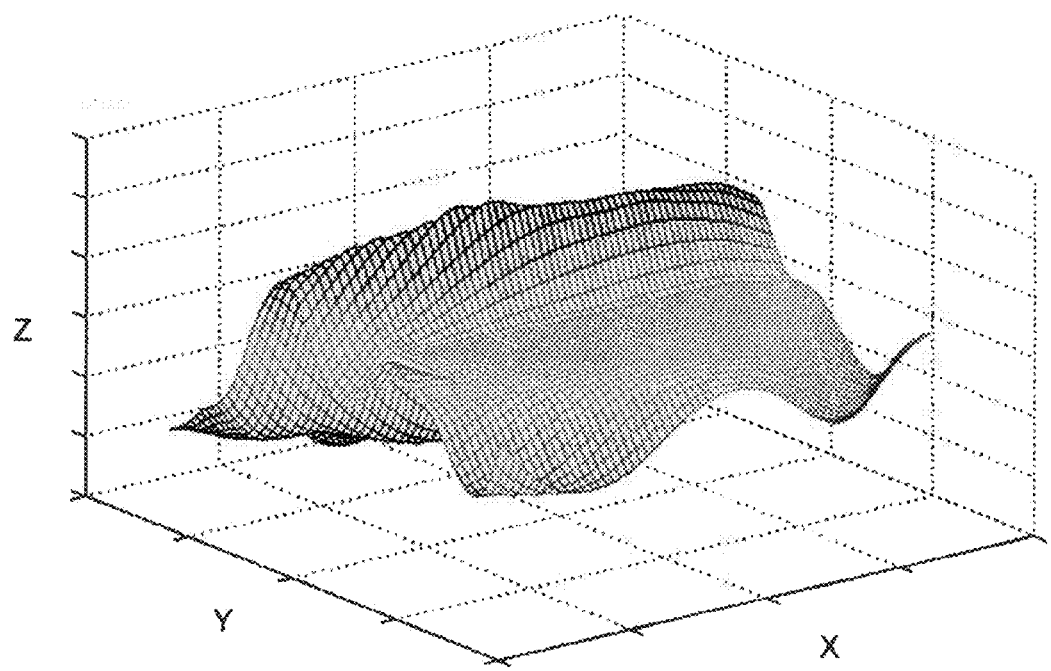
FIGS. 6-9 show various cost distribution plots of motion vectors associated with various video sequences.
Figure 7:
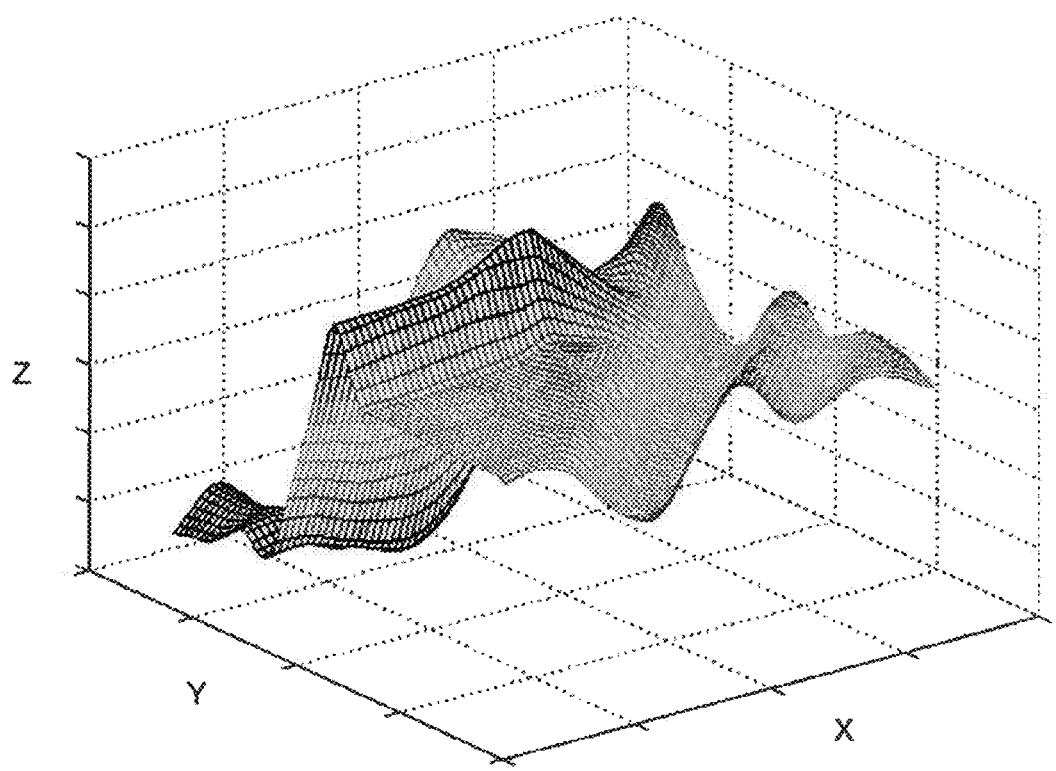

FIG. 4 is a block diagram showing an example video system 400 according to embodiments of the invention. FIG. 5 is a block diagram illustrating aspects of a video encoder 405 of FIG. 4. A description of various example embodiments of the invention is given with reference to FIG. 4 and FIG. 5.

In one example embodiment, the system 400 includes a video encoder 405, a video decoder 415, and a video display 420. While the video system 400 shows one example configuration, other embodiments having different components can be used without departing from the scope of this disclosure.

In one aspect, the video encoder 405 compresses video information such as a sequence of video frames. In another aspect, the video decoder 415 receives and decompresses the compressed video. The video encoder 405 and the video decoder 415 may each support the H.264 standard. The H.264 standard uses a tree-structured motion compensation method. This method supports variable motion compensation block or partition sizes that range from 4×4 to 16×16. For luminance samples, each 16×16 macroblock may be formed from one or more 16×16, 16×8, 8×16, or 8×8 blocks. Each 8×8 block can be further partitioned into 8×4, 4×8, or 4×4 blocks. This provides more flexibility in the selection of motion compensation blocks and allows a large number of variable block size combinations to be used to match the shape of different objects in a video image or frame.

To implement the H.264 standard or other compression scheme, the video encoder 405 and the video decoder 415 may be capable of performing subpixel interpolation. Subpixel interpolation allows the video encoder 405 and the video decoder 415 to identify and operate on subpixels or fractional pixels for images being compressed or decompressed. The subpixels or fractional pixels may be identified using pixels contained in the images being compressed or decompressed.

In some embodiments, the video encoder 405 and the video decoder 415 each includes one or more subpixel interpolation units, such as subpixel interpolation unit 540, and may also include a memory device such as memory device 545. The subpixel interpolation unit 540 may generate the subpixels by performing interpolation using the original image pixels, and the memory device 545 may store the values of the various pixels and subpixels.

The video encoder 405 represents any suitable apparatus, system, software, or mechanism for producing or otherwise providing compressed video information. For example, the video encoder 405 could represent a digital video recorder capable of compressing video information for storage on non-volatile memory 440, such as a flash memory chip or card. The video encoder 405 could also represent a digital versatile disc (DVD) burner or other optical disc burner capable of storing compressed video information on a DVD or other optical disc 435. The video encoder 405 could further represent a digital video recorder capable of compressing video information for storage on a hard disk drive (HDD) 430. As another example, the video encoder 405 could represent a streaming-video transmitter capable of transmitting streaming video to a video decoder 415 over a network 425, such as the Internet, a digital subscriber line (DSL), a wireless network, or a satellite system, among other possibilities. The video encoder 405 includes any hardware, such as ASIC, FPGA, DSP or microprocessor, software such as specially generated programs or codes structured to operate in conjunction with the hardware listed above, firmware, or combination thereof for compressing video information.

The video decoder 415 may decompress the compressed video information provided by the video encoder 405. The video decoder 415 represents any suitable apparatus, system, or mechanism for decompressing video information. For example, the video decoder 415 could represent a digital video player capable of retrieving compressed video information from the non-volatile memory 440. The video decoder 415 could further represent a digital video player capable of decompressing video information stored on hard disk drive 430. The decoder 420 could also represent a DVD player or other optical disc player capable of retrieving compressed video information from the optical disk 435. The video decoder 415 includes any hardware, such as ASIC, FPGA, DSP or microprocessor, software such as specially generated programs or codes structured to operate in conjunction with the hardware listed above, firmware, or combination thereof for decompressing video information.

In the illustrated example, the video decoder 415 decompresses the compressed video information and provides the decompressed video information to a video display 420 for presentation to a viewer. The video display 420 represents any suitable device, system, or structure for presenting video information to one or more viewers. The video display 420 could, for example, represent a television, computer monitor, or projector, among other possibilities. The video decoder 415 could provide the decompressed video information to any other destination, such as a video cassette player (VCR) or other recording device (not shown).

Although illustrated in FIG. 4 as separate components, the video encoder 405 and the video decoder 415 could operate within a single device or apparatus. For example, the video encoder 405 and the video decoder 415 could operate within a digital video recorder or other device. Similarly, the components such as the non-volatile memory 440 or the hard disk drive 430 could also operate within the single device or apparatus. The video encoder 405 could receive and compress the video information for storage on the non-volatile memory 440 or hard disk drive 430, and the video decoder 415 could retrieve and decompress the video information for presentation.

The video encoder 405 may receive the video information from the video source 410. The video source 410 provides a video information signal containing video information to be compressed by the video encoder 405. The video source 410 represents any device, system, or structure capable of generating or otherwise providing uncompressed or previously compressed video information. The video source 410 could, for example, represent a television receiver, a VCR, a video camera, a storage device capable of storing raw video data, or any other suitable source of video information.

The video encoder 405 may include motion vector selector 505. The motion vector selector 505 may receive a predicted motion vector from the predicted motion vector generation unit 530, and may generate one or more final motion vector to be transmitted to the encoding device 535. The final motion vector may comprise a final full pixel motion vector. The encoding device 535 may produce compressed video information based on the one or more final motion vectors. For example, the motion vector selector 505 may generate a final full pixel motion vector for each of several macroblocks associated with a video image or frame, as will be discussed in detail below. The encoding device 535 may implement any suitable encoding technique. The encoding device 535 may also implement half pixel or quarter pixel refinement on the final full pixel motion vector using the subpixel interpolation unit 540. Alternatively, the half pixel or quarter pixel refinement on the final full pixel motion vector could be performed by the motion vector selector 505 prior to transmitting the final motion vector to the encoding device 535.

The motion vector selector 505 may receive the original video information from an input circuit 550 of the video encoder 405. The motion vector selector 505 may use the received video information to identify motion within video images being compressed, and may detect one or more best motion vector or best motion vector plane based on the predicted motion vector, which may then lead to the selection of a final motion vector, as will be further described below. The motion vector selector 505 may then output one or more final motion vector to the encoding device 535. Although the word "final" motion vector is used herein, such words should not be interpreted in an overly narrow or rigid sense; indeed, there may be more than one "final" motion vector, as there are more than one macroblock, and each macroblock may have associated therewith a best or "final" motion vector.

The motion vector selector 505 may include a first generator 515 to generate a cost associated with each of a set of motion vector locations in a first direction within a search window of a video image or frame. The motion vector selector 505 may also include a cross over point selector 510 to set a cross over point at one of the locations in the first direction, as will be described in further detail below. The motion vector selector 505 may further include a direction indicator 525 to sample a set of motion vector locations in two or more directions from the cross over point and select a preferred direction, as will also be described in further detail below. The motion vector selector 505 may also include a second generator 520 to generate a cost associated with each of a second set of motion vector locations in the preferred direction, as will also be further described. The motion vector selector 505 may further include a third generator 523 to generate a cost associated with each of a set of motion vector locations in a second direction in which the selector is structured to set the cross over point at one of the locations in the first or the second directions, as will also be further discussed in detail below.

The motion vector selector 505 may therefore output one or more final motion vectors, which represent the identified motion in the video images or frames. The final motion vectors may be provided to the encoding device 535 for coding as part of the compressed video information, which may then be output from the video encoder 405 using output circuit 555. The motion vector selector 505 includes any hardware, such as ASIC, FPGA, DSP or microprocessor, software such as specially generated programs or codes structured to operate in conjunction with the hardware listed above, firmware, or combination thereof for estimating motion in video images or frames. Although the motion vector selector 505 is illustrated as a number of separate functional blocks, for convenience, the functions may be implemented as more or fewer components. Further, although the labels first, second, third, etc., are also used for convenience, a single component or process may in fact generate the described result, or, an implementation may use multiple components to generate a single result.

Figure 8:
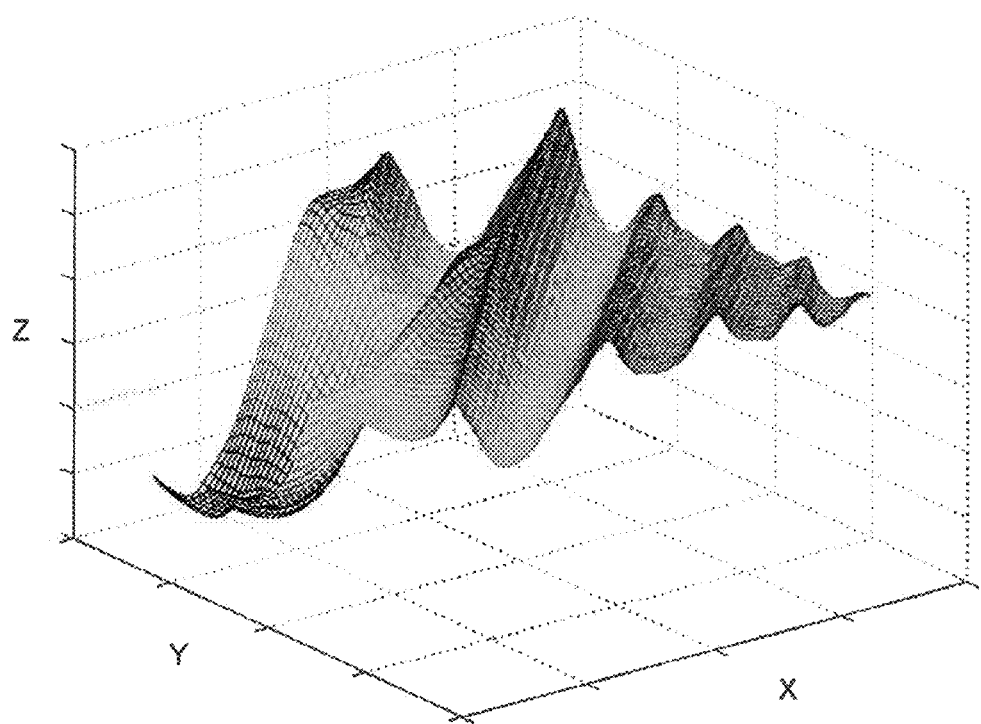
Figure 9:
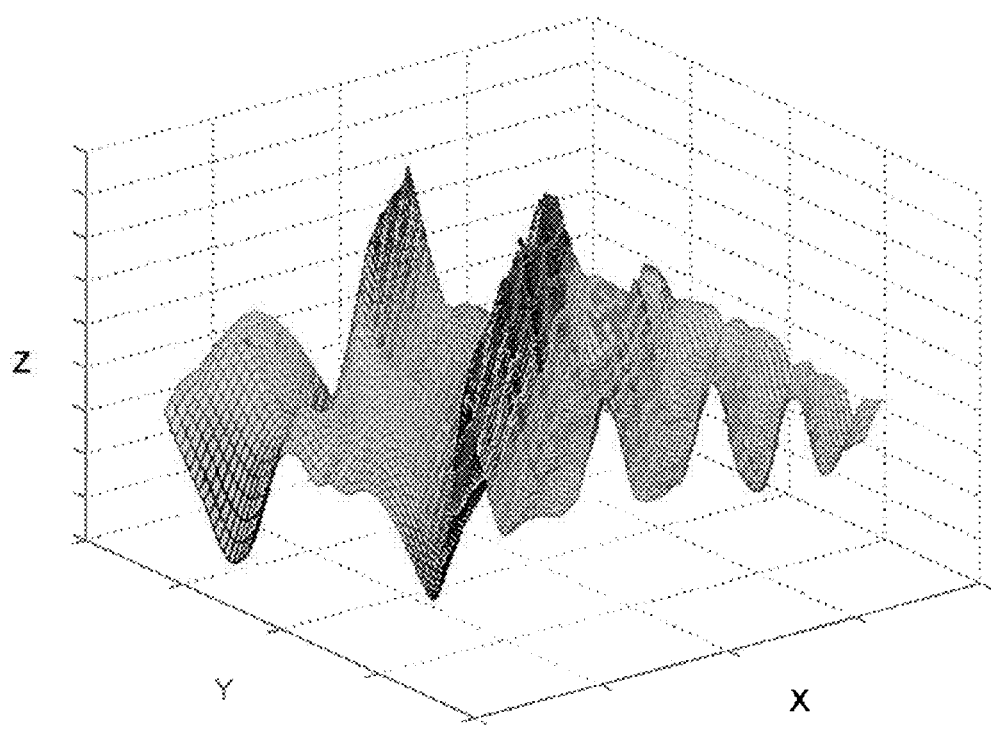

FIGS. 6-9 show various cost distribution plots of motion vectors associated with various video sequences. Motion in video sequences is typically smooth and contained from frame to frame. Due to this nature of video, the motion vectors tend to follow a certain pattern. When the cost distributions for various motion vectors are evaluated for different video sequences, the patterns become evident. For example, in FIGS. 6 and 7, mountain ranges can be detected in the X direction. In FIGS. 8 and 9, mountain ranges can be detected in the X-Y direction. As another example, if only the best vectors for each value of X are plotted, it can be seen that the best vectors are generally located along a single plane that is substantially parallel to an X-Z plane in FIGS. 6 and 7. Such a plane can be referred to as a best vectors plane, and will be discussed in further detail below. In FIGS. 8 and 9, the best vectors plane is formed along an X-Y-Z diagonal plane. These patterns are illustrative and other different patterns can also be formed based on any particular video sequence.

For the sake of perspective, the cost distributions shown in FIGS. 6-9 represent full searches rather than partial searches. In these figures, the cost at each motion vector is computed using the Sum of Transformed Differences (SATD), although other cost functions can be used. In addition, the Hadamard transform may be used to approximate the actual integer transform associated with the SATD, as was used with reference to these plots. A lower cost signifies a lower error from the current macroblock, and hence better compression. In FIGS. 6-9, the inverse of the cost has been plotted to make the plots more intuitive. For example, a higher Z value means a lower cost; the lower the cost, the better the motion estimation.

Figure 10:
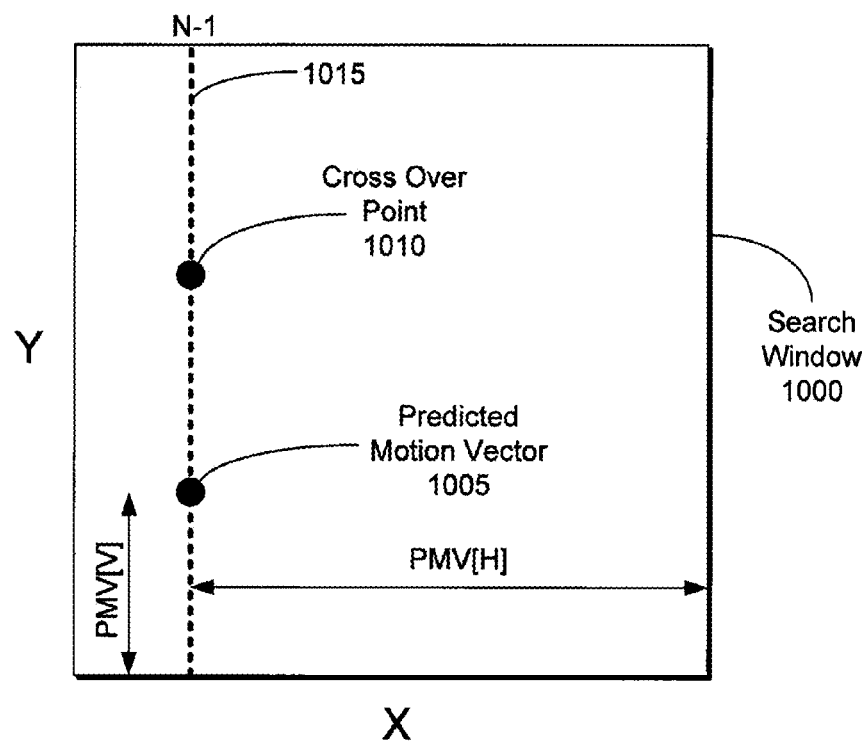
FIG. 10 is a block diagram of a search window according to an embodiment of the invention.
Figure 11:
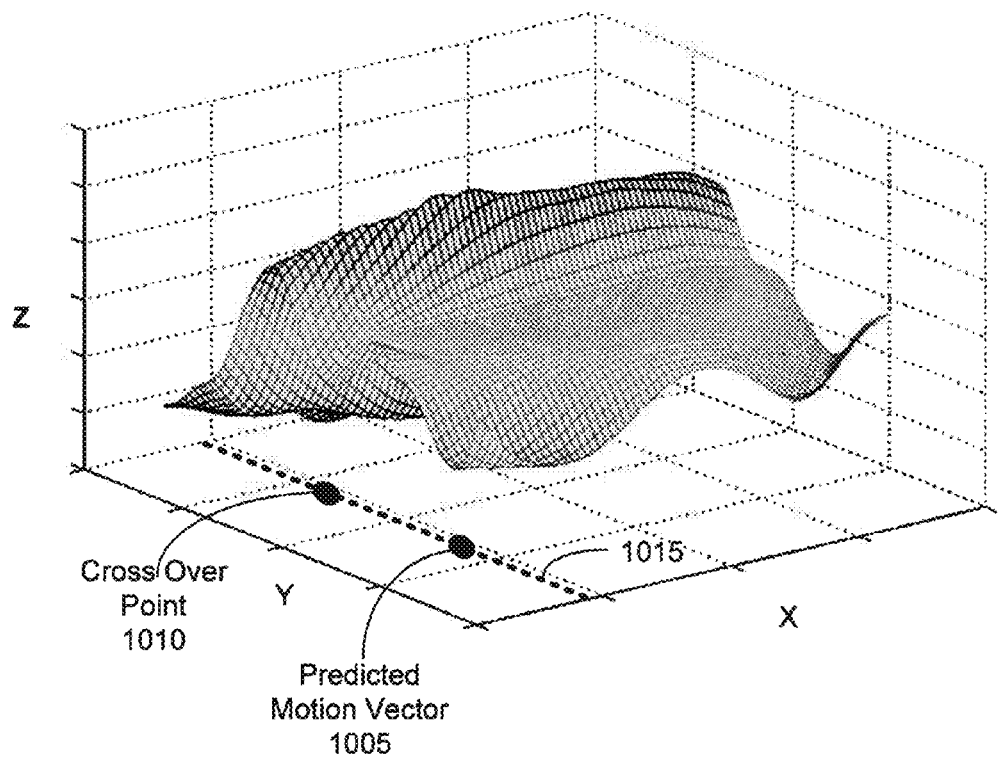
FIG. 11 is a diagram of a cost distribution plot associated with the search window of FIG. 10.

FIG. 10 is a block diagram of a search window 1000 according to a first embodiment of the invention. FIG. 11 is a cost distribution plot associated with a video sequence, and associated with the search window 1000 of FIG. 10. The following description is given with reference to FIGS. 10 and 11.

The search window 1000 may be associated with any part of the cost distribution plot of FIG. 11. For exemplary purposes, one can gain perspective of the relationship of FIGS. 10 and 11 by supposing that the search window 1000 having X and Y directions may be reoriented to the cost distribution of FIG. 11, also having X and Y directions, in addition to a Z direction. Each (X,Y) coordinate of the search window 1000 may correspond to a motion vector search location. Each Z value may correspond to a cost associated with a particular motion vector. As previously explained, a higher Z value means a lower cost.

In some embodiments, the cost distribution of FIG. 11 may represent a full search of search window 1000, while in other embodiments the cost distribution may represent a sub-area of the search window, or may represent only a subset of the full search. One of the aspects of the invention is to reduce the number of search locations within the search window 1000 while substantially maintaining the quality of the compressed video. In other words, while the cost distribution of FIG. 11 may represent a full search for the sake of perspective, the embodiments of the present determine one or more preferred motion vector without necessarily performing the full search.

An example method of selecting a preferred motion vector begins by receiving a predicted motion vector 1005. For example, the motion vector selector 505 (FIG. 5) may receive the predicted motion vector (PMV) 1005 from the predicted motion vector generation unit 530. The PMV 1005 may be determined from the neighboring macroblocks according to the H.264 specification. The predicted motion vector 1005 includes a horizontal component PMV[H] and a vertical component PMV[V] as shown in FIG. 10. The vertical component PMV[V] can be measured from any end of the search window 1000 to the vertical coordinate of the PMV 1005. Similarly, the horizontal component PMV[H] can be measured from any end of the search window 1000 to the horizontal coordinate of the PMV 1005.

The search window 1000 preferably comprises N×N dimensions, but may also have other dimensions such as an N×M search window. If the search window comprises the N×N dimension, consecutive motion vector locations may be searched with X=PMV[H] and Y ranging from 0 to N−1 as represented by line 1015. For example, as part of the search, the first generator 515 (FIG. 5) may generate a cost associated with each of the motion vector locations in the search window 1000 along the Y direction associated with the PMV 1005. During this search, the motion vector locations may have a fixed coordinate in the X direction. If the search window is N×M, a similar search can be performed according to those dimensions. Alternatively, the Y and X directions can be interchanged so that the search is performed along the X direction associated with the PMV 1005, and in such case, the motion vector locations may have a fixed coordinate in the Y direction. The search represented by line 1015 can include generating a cost associated with each of the motion vector locations along the direction of line 1015, or could include another process to select the desired motion vector.

The motion vector location that yields the lowest cost in the search represented by line 1015 is termed as a cross over point 1010. In other words, the cross over point 1010 is determined as having a lowest cost motion vector from among the motion vector locations searched along line 1015. For example, the cross over point selector 510 (of FIG. 5) may select the lowest cost motion vector 1010 from among the motion vector locations searched along line 1015. The motion vector locations searched along line 1015 may be consecutively arranged and/or consecutively searched along the Y direction. As illustrated in FIG. 11, the PMV 1005 may be associated with one cost, while the cross over point 1010 may be associated with another cost lower than the cost associated with the PMV 1005. Indeed, the cost associated with the cross over point 1010 is typically the lowest cost motion vector from among all the motion vector locations searched along line 1015. Once the cross over point 1010 has been determined, a best motion vectors plane can be determined, as will now be described with reference to FIGS. 12 and 13.

Figure 12:
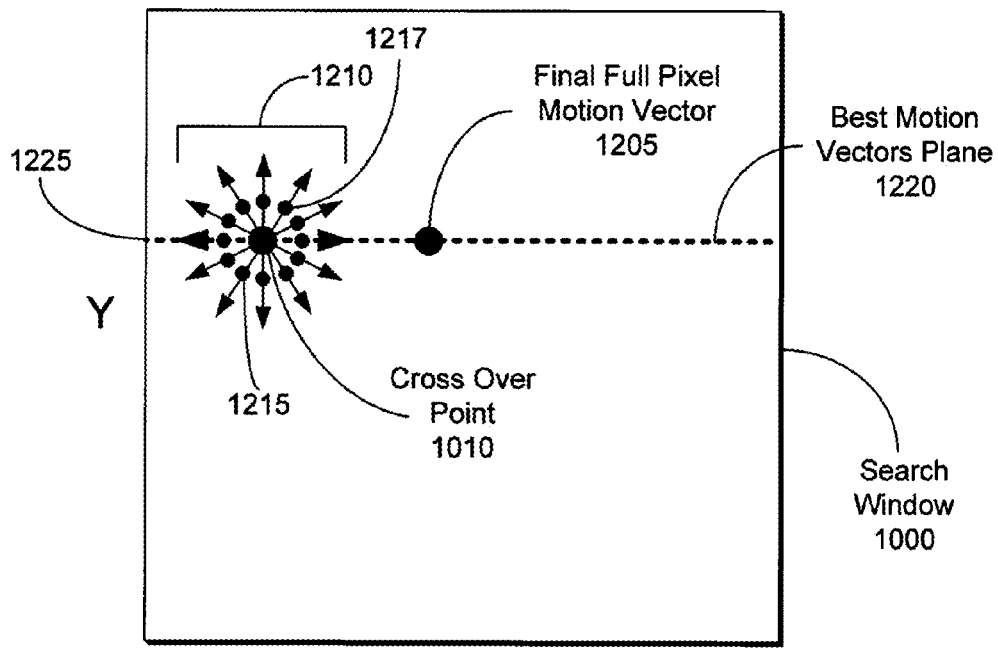
FIG. 12 is a block diagram of the search window of FIG. 10 illustrating processes according to embodiments of the invention.
Figure 13:
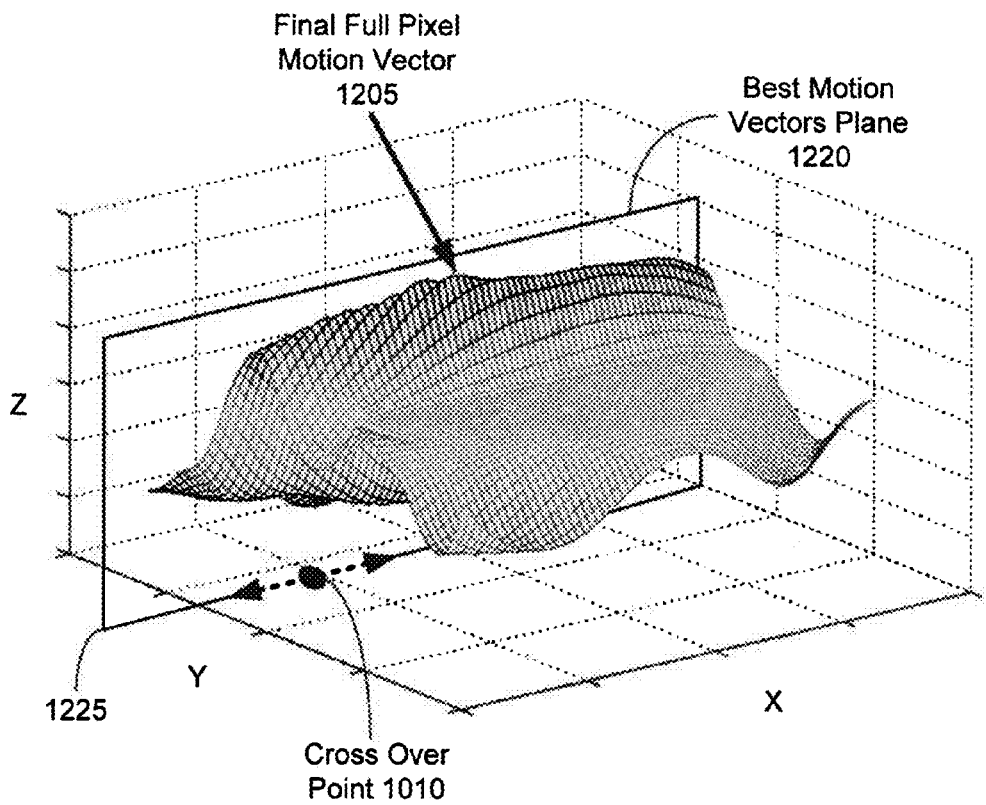
FIG. 13 is the cost distribution plot diagram as shown in FIG. 11 including a best motion vectors plane.

FIG. 12 is a block diagram of the search window 1000 of FIG. 10 illustrating methods used by embodiments of the invention. FIG. 13 is the cost distribution plot diagram as shown in FIG. 11, additionally including a best motion vectors plane 1220. The following description is given with reference to FIGS. 12 and 13.

The method of selecting the preferred motion vector further includes determining a best motion vectors plane 1220 associated with the previously determined cross over point 1010. For example, a cost is generated that is associated with each of a number of sample motion vector locations (e.g., 1215 and 1217) in multiple directions about the cross over point 1010. In other words, a cost may be generated for at least one sample motion vector, such as motion vector location 1215, in each of a predefined number of directions 1210 extending from the cross over point 1010. In one embodiment, the direction indicator 525 (FIG. 5) may sample a set of motion vector locations (e.g., 1215 and 1217) in two or more directions 1210 from the cross over point 1010 and select a preferred direction 1225 because the lowest cost point about the cross over point 1010 was found along that line. The best motion vectors plane 1220 may then be associated with or otherwise oriented to the preferred direction 1225 based on the sample motion vector costs.

More specifically, orienting the best motion vectors plane 1220 to the preferred direction 1225 may include selecting a lowest cost orientation corresponding to at least one of the number of directions 1210 extending from the cross over point 1010. Selecting the lowest cost orientation may include summing costs of the sample motion vectors for opposite direction pairs (e.g., 1215 and 1217) extending from the cross over point 1010, and comparing the summed costs for each pair to each other. For example, the cost associated with motion vector location 1215 may be summed with the cost associated with motion vector location 1217 extending in opposite directions, which may be equidistant from the cross over point 1010. A similar summing procedure may be carried out for each of the opposite direction pairs 1210. Then, whichever summed cost gives the lowest total cost may be associated with the direction of the best motion vectors plane 1220. Persons with skill in the art will recognize that more than one sample motion vector locations can be sampled in any given direction to provide even further refinement of the direction of the best motion vectors plane 1220. Moreover, while FIG. 12 shows twelve 12 sample motion vector locations, it should be understood that any number of sample motion vector locations can be used to achieve further refinement of the direction of the best motion vectors plane 1220.

Once the direction of the best motion vectors plane 1220 is determined, motion vectors along the direction of the best motion vectors plane 1220 are searched. The search represented by the best motion vectors plane 1220 can include generating a cost associated with each of the motion vector locations along the direction 1225 of the best motion vectors plane 1220. For example, the second generator 520 (FIG. 5) may generate a cost for or otherwise search each motion vector location along the preferred direction 1225. The direction 1225 associated with the best motion vectors plane 1220 may be different from the direction of 1015 associated with the PMV 1005 (of FIG. 10), although the cross over point 1010 is the same. The motion vector locations searched along the best motion vectors plane 1220 may be consecutively arranged and/or consecutively searched along the direction of the best motion vectors plane 1220.

Still referring to FIGS. 12 and 13, a lowest cost motion vector from among the motion vector locations searched along the best motion vectors plane 1220 may be selected as the preferred motion vector. The preferred motion vector may be referred to as a final motion vector or a final full pixel motion vector, such as final full pixel motion vector 1205. As previously mentioned above, the motion vector selector 505 (FIG. 5) may receive the predicted motion vector 1005 (FIG. 10) from the predicted motion vector generation unit 530, and may generate one or more final motion vector 1205 to be transmitted to the encoding device 535.

Generally, the final motion vector 1205 provided to the encoding device 535 (FIG. 5) is a full pixel motion vector 1205. The encoding device 535 may also implement half pixel or quarter pixel refinement on the final full pixel motion vector 1205 using the subpixel interpolation unit 540. Alternatively, the half pixel or quarter pixel refinement on the final full pixel motion vector 1205 can be performed by the motion vector selector 505 before transmitting the final motion vector 1205 to the encoding device 535. As previously mentioned, although the word "final" motion vector is used herein, such words should not be interpreted in an overly narrow or rigid sense; indeed, there may be more than one "final" motion vector, as there are more than one macroblock, and each macroblock may have associated therewith a best or "final" motion vector. The search method described herein can be referred to as a cross hair search.

If the search window has dimensions of N×N, the number of searches for determining the cross over point 1010 is N because the predicted vector generated the starting line 1015 from either the horizontal or vertical component of the predicted vector. The number of searches for determining a direction 1225 associated with the best motion vectors plane 1220 may be somewhere between 10 and 20, and preferably 12 or 14. The maximum number of searches along the best motion vectors plane 1220 is N. Therefore, in this scenario, assuming 12 searches are performed for selecting the direction 1225, the total number of searches for the cross hair search is 2N+12, or thereabout, while substantially maintaining the quality of the compressed video. Considering that a full search of the search window 1000 would need about N*N searches, the cross hair search provides a substantial cost savings in terms of computational resources or time or both.

Figure 14:
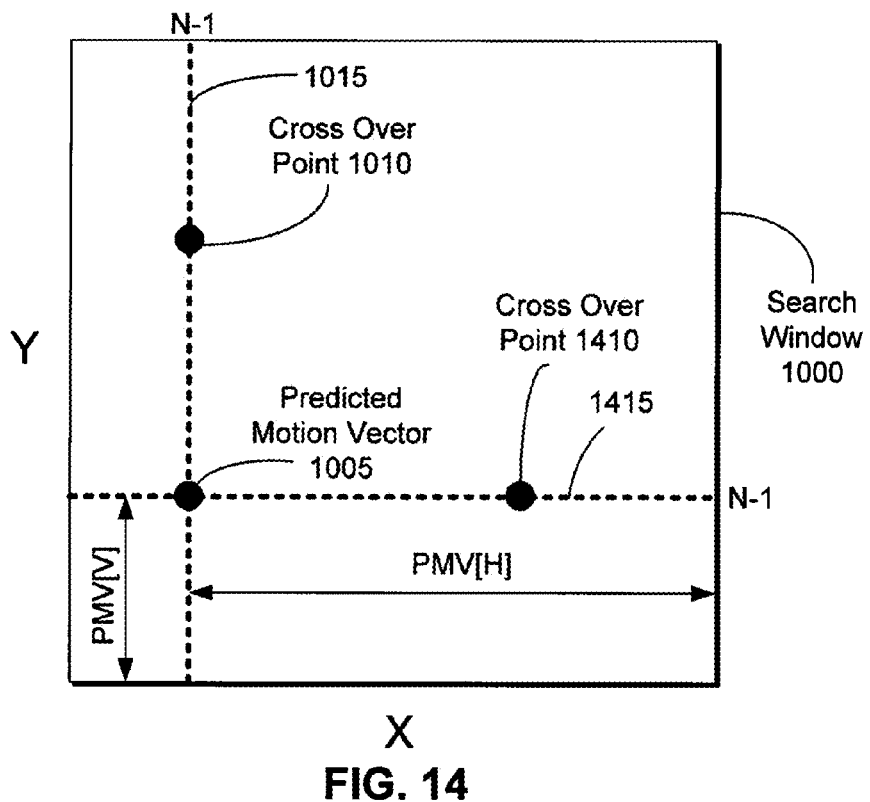
FIG. 14 is a block diagram of a search window according to another embodiment of the invention.
Figure 15:
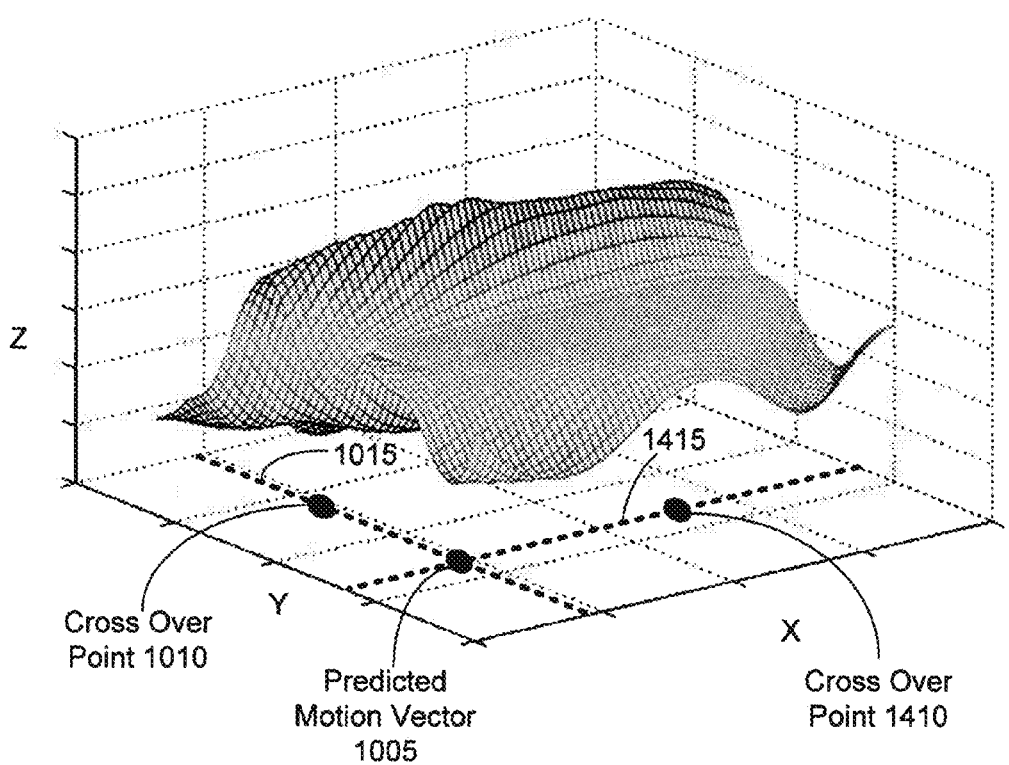
FIG. 15 is a diagram of a cost distribution plot associated with the search window of FIG. 14.

FIG. 14 is a block diagram of a search window according to another embodiment of the invention. FIG. 15 is a diagram of a cost distribution plot associated with the search window of FIG. 14. The description is given with reference to FIGS. 14 and 15.

The block diagram of FIG. 14 generally corresponds to the block diagram of FIG. 10, with the noted difference of the second cross over point 1410. The probability of finding the best final full pixel motion vector 1205 can be further improved by applying the cross hair search in two or more passes. As before, after the predicted motion vector 1005 is received, the first cross over point 1010 is determined using the procedure mentioned above with reference to FIG. 10. The second cross over point 1410 may then be determined as follows.

In the embodiment illustrated in FIGS. 13 and 14, if the search window 1000 includes N×N dimensions, consecutive motion vector locations are searched with Y=PMV[V] and X ranging from 0 to N−1 as represented by line 1415. For example, the third generator 523 (FIG. 5) may generate a cost for or otherwise search each motion vector location in the search window 1000 along the X direction associated with the PMV 1005. During this search, the motion vector locations have a fixed coordinate in the Y direction. If the search window is N×M, a similar search can be performed according to those dimensions. Alternatively, the X and Y directions can be interchanged so that the search is performed along the Y direction associated with the PMV 1005, and in such case, the motion vector locations have a fixed coordinate in the X direction. The search represented by line 1415 can include generating a cost associated with each of the motion vector locations along the direction of line 1415, or could include another method of choosing the desired motion vector.

The motion vector location that yields the lowest cost in the search represented by line 1415 is termed as the second cross over point 1410. In other words, the second cross over point 1410 is determined as having a lowest cost motion vector from among the motion vector locations searched along line 1415. For example, the cross over point selector 510 (of FIG. 5) may select the lowest cost motion vector 1410 from among the motion vector locations searched along line 1415. The motion vector locations searched along line 1415 may be consecutively arranged and/or consecutively searched along the X direction. As illustrated in FIG. 15, the PMV 1005 may be associated with one cost, the first cross over point 1010 may be associated with another different cost, and the second cross over point 1410 may be associated with yet another different cost. Indeed, the cost associated with the first cross over point 1010 may be the lowest cost motion vector from among the motion vector locations searched along line 1015, and the cost associated with the second cross over point 1410 may be the lowest cost motion vector from among the motion vector locations searched along line 1415. Once the first cross over point 1010 and the second cross over point 1410 have been determined, one of the cross over points can be selected as the preferred cross over point.

To select the preferred cross over point, a cost associated with each of the cross over points 1010 and 1410 may be compared with each other, and the cross over point having the lowest cost may be selected as the preferred cross over point. For example, the cross over point selector 510 (of FIG. 5) may select the lowest cost cross over point. In the example shown in FIGS. 14 and 15, cross over point 1010 is selected as the preferred cross over point because the motion vector associated with cross over point 1010 has a lower cost than the motion vector associated with cross over point 1410.

Once the preferred cross over point (e.g., 1010) has been selected, the process can proceed with selecting the best motion vectors plane 1220 as will now be described with reference to FIGS. 16 and 17

Figure 16:
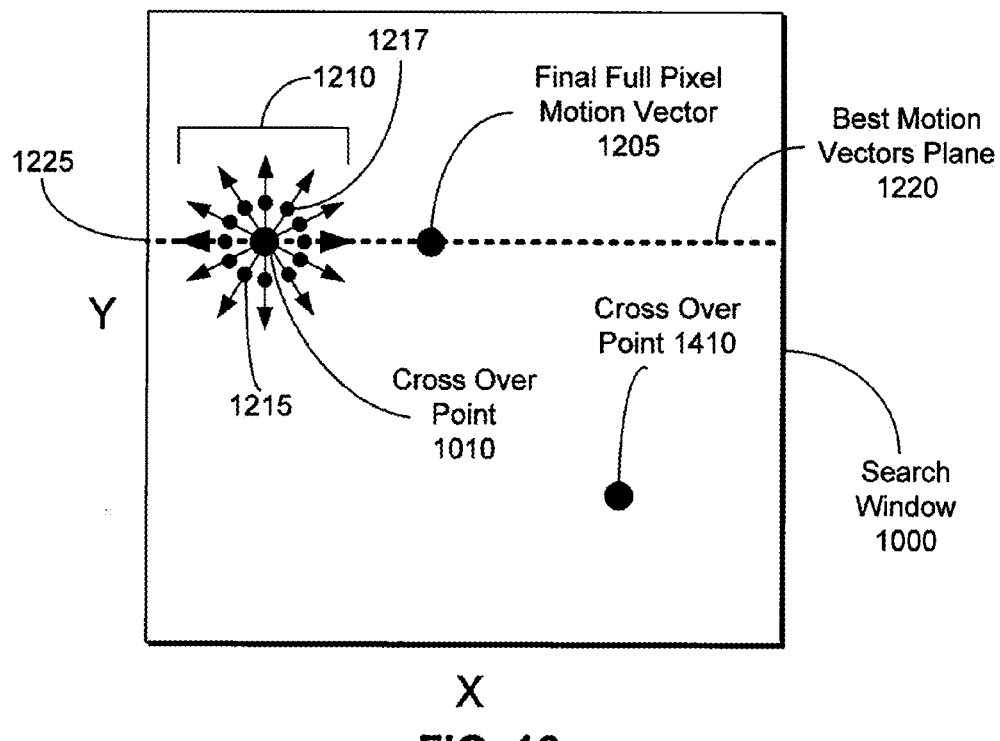
FIG. 16 is a block diagram of the search window of FIG. 14 illustrating processes according to embodiments of the invention.
Figure 17:
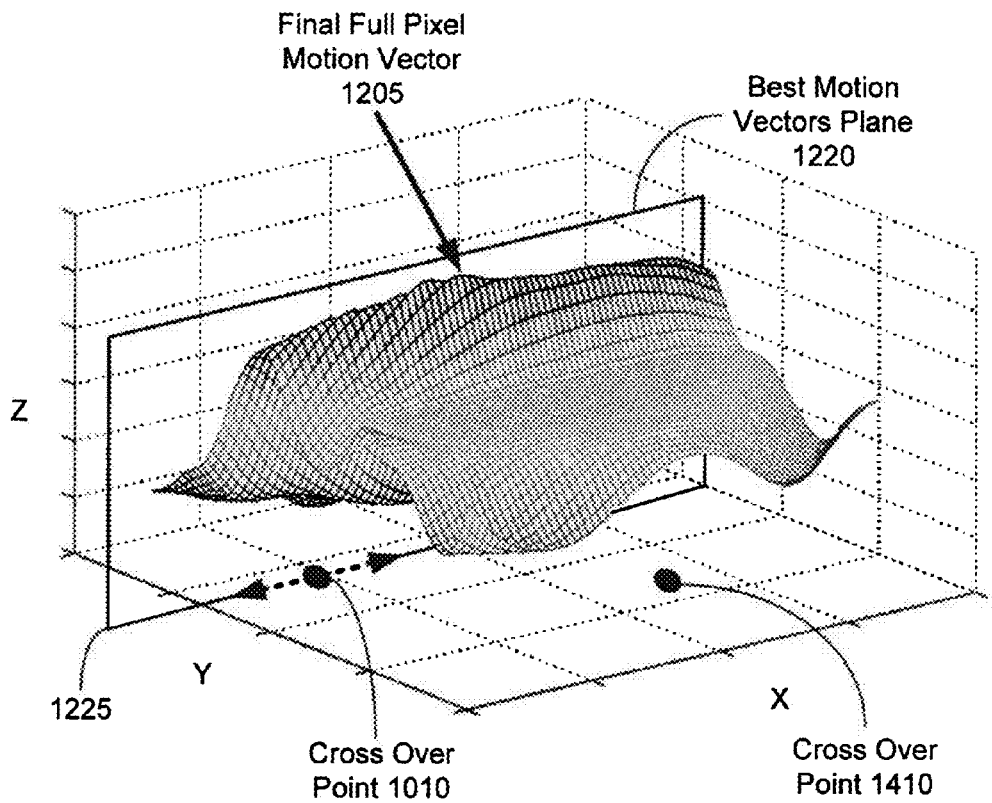
FIG. 17 is the cost distribution plot diagram as shown in FIG. 15 including a best motion vectors plane.

FIG. 16 is a block diagram of the search window 1000 of FIG. 14 according to embodiments of the invention. FIG. 17 is the cost distribution plot diagram as shown in FIG. 15 additionally including a best motion vectors plane 1220. The procedure for determining the final motion vector 1205 with reference to FIGS. 16 and 17 is substantially similar to that described above with reference to FIGS. 12 and 13, and therefore, for the sake of brevity, such a detailed description will be omitted. It should be understood, however, that determining the best motion vectors plane 1220 proceeds in relation to the preferred cross over point (e.g., cross over point 1010), not the second cross over point 1410 because the cross over point 1010 was chosen as the lowest cost of the two points 1010, 1410. For example, a cost may be generated with each of a number of sample motion vectors (e.g., 1215 and 1217) about the preferred cross over point (e.g., cross over point 1010), and the direction of the motion vectors plane 1220 can be determined as previously explained. However, if the mountain range shown in the cost distribution of FIG. 17 were to be oriented differently (not shown) such that second cross over point 1410 resulted in the lowest cost among the two cross over points rather than the first cross over point 1010, the best motion vectors plane 1220 would be determined accordingly, and the search for the final motion vector 1205 would correspond to the best motion vectors plane 1220, which would correspond to the second cross over point 1410.

Figure 18:
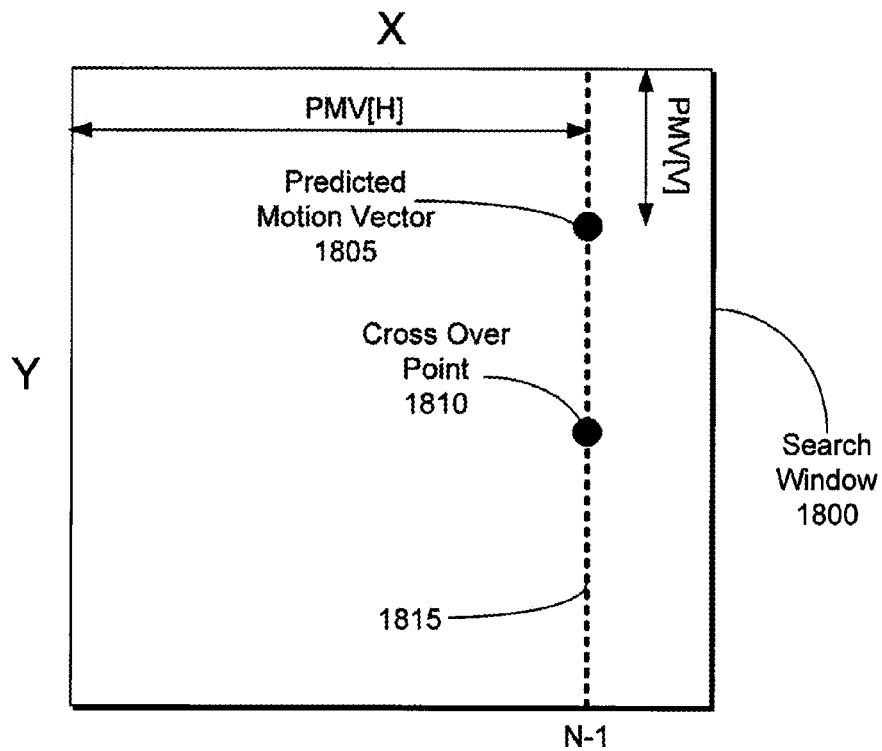
FIG. 18 is a block diagram of a search window according to another embodiment of the invention.

FIG. 18 is a block diagram of a search window according to another embodiment of the invention. Each (X, Y) coordinate of the search window 1800 may correspond to a cost associated with a particular motion vector. A method of selecting a preferred motion vector may begin by receiving a predicted motion vector 1805. For example, the motion vector selector 505 (FIG. 5) may receive the predicted motion vector (PMV) 1805 from the predicted motion vector generation unit 530. The PMV 1805 may be determined from the neighboring macroblocks according to the H.264 specification. The predicted motion vector 1805 includes a horizontal component PMV[H] and a vertical component PMV[V] as shown in FIG. 18. The vertical component PMV[V] can be measured from any end of the search window 1800 to the vertical coordinate of the PMV 1805. Similarly, the horizontal component PMV [H] can be measured from any end of the search window 1800 to the horizontal coordinate of the PMV 1805.

The search window 1800 preferably includes N×N dimensions, but may also have other dimensions such as an N×M search window. If the search window includes the N×N dimension, consecutive motion vector locations may be searched with X=PMV[H] and Y ranging from 0 to N−1 as represented by line 1815. For example, the first generator 515 (of FIG. 5) may generate a cost for or otherwise search each motion vector location in the search window 1800 along the Y direction associated with the PMV 1805. During this search, the motion vector locations may have a fixed coordinate in the X direction. If the search window is N×M, a similar search can be performed according to those dimensions. Alternatively, the Y and X directions can be interchanged so that the search is performed along the X direction associated with the PMV 1805, and in such case, the motion vector locations may have a fixed coordinate in the Y direction. The search represented by line 1815 can include generating a cost associated with each of the motion vector locations along the direction of line 1815, or could include another method of choosing the desired motion vector.

The motion vector location that yields the lowest cost in the search represented by line 1815 is termed as a cross over point 1810. In other words, the cross over point 1810 is determined as having a lowest cost motion vector from among the motion vector locations searched along line 1815. For example, the cross over point selector 510 (of FIG. 5) may select the lowest cost motion vector 1810 from among the motion vector locations searched along line 1815. The motion vector locations searched along line 1815 may be consecutively arranged and/or consecutively searched along the Y direction. The PMV 1805 may be associated with one cost, while the cross over point 1810 may be associated with another cost lower than the cost associated with the PMV 1805. Indeed, the cost associated with the cross over point 1810 may be the lowest cost motion vector from among the motion vector locations searched along line 1815. Once the cross over point 1810 has been determined, a best motion vectors plane can be determined, as will now be described with reference to FIG. 19.

Figure 19:
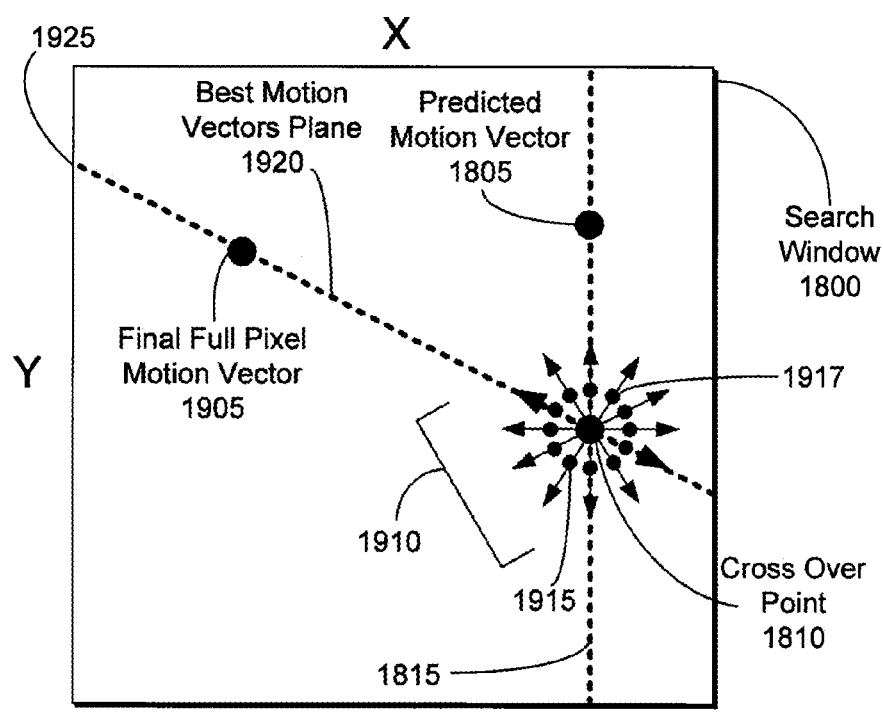
FIG. 19 is a block diagram of the search window of FIG. 18 including a final motion vector.

FIG. 19 is a block diagram of the search window 1800 of FIG. 18 including a final motion vector 1905. The method of selecting the preferred motion vector may continue by determining a best motion vectors plane 1920 associated with the cross over point 1810. For example, a cost may be generated that is associated with each of a number of sample motion vector locations (e.g., 1915 and 1917) about the cross over point 1810. In other words, a cost may be generated for at least one sample motion vector such as motion vector location 1915 in each of a number of directions 1910 extending from the cross over point 1810. In one embodiment, direction indicator 525 (FIG. 5) may sample a set of motion vector locations (e.g., 1915 and 1917) in two or more directions 1910 from the cross over point 1810 and select a preferred direction 1925. The best motion vectors plane 1920 may then be associated with or otherwise oriented to the preferred direction 1925 based on the sample motion vector costs.

More specifically, orienting the best motion vectors plane 1920 to the preferred direction 1925 may include selecting a lowest cost orientation corresponding to at least one of the predefined number of directions 1910 extending from the cross over point 1810. Selecting the lowest cost orientation may include summing costs of the sample motion vectors for opposite direction pairs (e.g., 1915 and 1917) extending from the cross over point 1810, and comparing the summed costs for each pair to each other. For example, the cost associated with motion vector location 1915 may be summed with the cost associated with motion vector location 1917 extending in opposite directions, which may be equidistant from the cross over point 1810. A similar summing procedure may be carried out for each of the opposite direction pairs 1910. Then, whichever summed cost gives the lowest total cost may be associated with the direction of the best motion vectors plane 1920. Persons with skill in the art will recognize that more than one sample motion vector locations can be sampled in any given direction to provide even further refinement of the direction of the best motion vectors plane 1920. Moreover, while FIG. 19 shows twelve 12 sample motion vector locations, it should be understood that any number of sample motion vector locations can be used to achieve further refinement of the direction of the best motion vectors plane 1920.

Once the direction of the best motion vectors plane 1920 is determined, motion vectors along the direction of the best motion vectors plane 1920 may be searched. The search represented by the best motion vectors plane 1920 can include generating a cost associated with each of the motion vector locations along the direction 1925 of the best motion vectors plane 1920. For example, the second generator 520 (FIG. 5) may generate a cost for or otherwise search each motion vector location along the preferred direction 1925. The direction 1925 associated with the best motion vectors plane 1920 is different from the direction of 1815 associated with the PMV 1805 (FIG. 18), although the cross over point 1810 is the same. The motion vector locations searched along the best motion vectors plane 1920 may be consecutively arranged and/or consecutively searched along the direction of the best motion vectors plane 1920. It should be understood, as illustrated in FIG. 19, that the best motion vectors plane 1920 need not be oriented perpendicular to the line 1815. Indeed, the best motion vectors plane 1920 can be oriented at any angle respective to the line 1815. Thus, in embodiments of the invention, the final motion vector 1905 can be found even in cases where the cost distribution includes mountain ranges that are not perpendicular to the X or Y directions, such as those shown in FIGS. 8 and 9.

Still referring to FIG. 19, a lowest cost motion vector from among the motion vector locations searched along the best motion vectors plane 1920 may be selected as the preferred motion vector. The preferred motion vector may be referred to as a final motion vector or a final full pixel motion vector, such as final full pixel motion vector 1905. As previously mentioned above, the motion vector selector 505 (FIG. 5) may receive the predicted motion vector 1805 (FIG. 18) from the predicted motion vector generation unit 530, and may generate one or more final motion vector 1905 to be transmitted to the encoding device 535.

Generally, the final motion vector 1905 provided to the encoding device 535 (FIG. 5) is a full pixel motion vector 1905. The encoding device 535 may also implement half pixel or quarter pixel refinement on the final full pixel motion vector 1905 using the subpixel interpolation unit 540. Alternatively, the half pixel or quarter pixel refinement on the final full pixel motion vector 1905 can be performed by the motion vector selector 505 prior to transmitting the final motion vector 1905 to the encoding device 535. As previously mentioned, although the word "final" motion vector is used herein, such words should not be interpreted in an overly narrow or rigid sense; indeed, there may be more than one "final" motion vector, as there are more than one macroblock, and each macroblock may have associated therewith a best or "final" motion vector.

Figure 20:
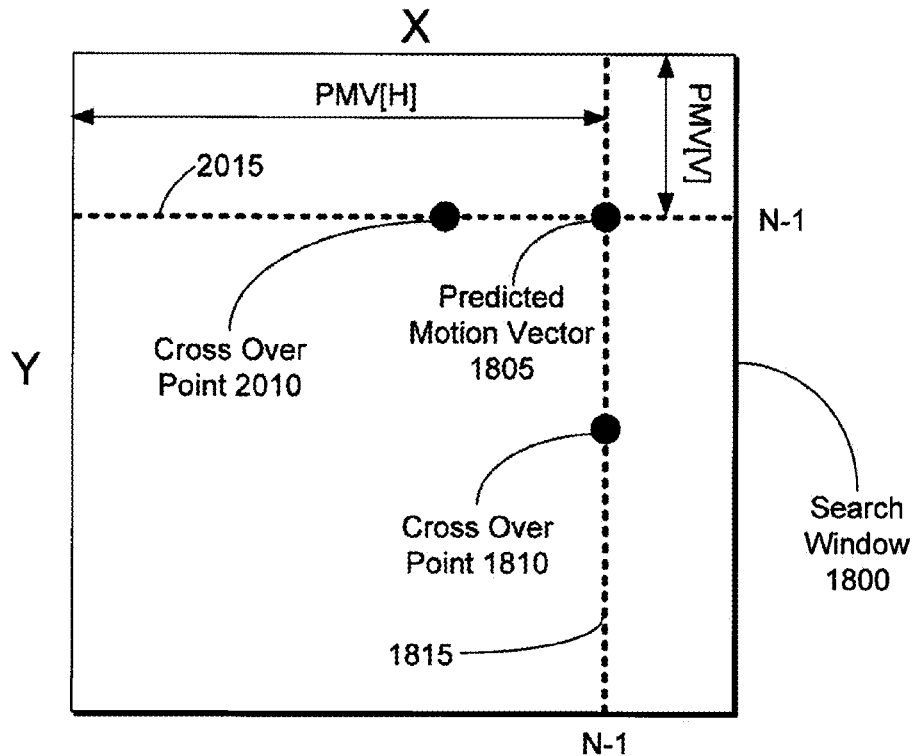
FIG. 20 is a block diagram of a search window according to yet another embodiment of the invention.

FIG. 20 is a block diagram of a search window according to yet another embodiment of the invention. The block diagram of FIG. 20 generally corresponds to the block diagram of FIG. 18, with the noted difference of the second cross over point 2010. The probability of finding the best final full pixel motion vector 1905 can be further improved by applying the cross hair search in two or more passes. As before, the predicted motion vector 1805 may be received, and the first cross over point 1810 may be determined using the procedure mentioned above with reference to FIG. 18. The second cross over point 2010 may then be determined as follows.

If the search window 1800 includes N×N dimensions, consecutive motion vector locations may be searched with Y=PMV[V] and X ranging from 0 to N−1 as represented by line 2015. For example, the third generator 523 (FIG. 5) may generate a cost for or otherwise search each motion vector location in the search window 1800 along the X direction associated with the PMV 1805. During this search, the motion vector locations may have a fixed coordinate in the Y direction. If the search window is N×M, a similar search can be performed according to those dimensions. Alternatively, the X and Y directions can be interchanged so that the search is performed along the Y direction associated with the PMV 1805, and in such case, the motion vector locations may have a fixed coordinate in the X direction. The search represented by line 2015 can include generating a cost associated with each of the motion vector locations along the direction of line 2015.

The motion vector location that yields the lowest cost in the search represented by line 2015 is termed as the second cross over point 2010. In other words, the second cross over point 2010 is determined as having a lowest cost motion vector from among the motion vector locations searched along line 2015. For example, the cross over point selector 510 (of FIG. 5) may select the lowest cost motion vector 2010 from among the motion vector locations searched along line 2015. The motion vector locations searched along line 2015 may be consecutively arranged and/or consecutively searched along the X direction. The PMV 1805 may be associated with one cost, the first cross over point 1810 may be associated with another different cost, and the second cross over point 2010 may be associated with yet another different cost. Indeed, the cost associated with the first cross over point 1810 may be the lowest cost motion vector from among the motion vector locations searched along line 1815, and the cost associated with the second cross over point 2010 may be the lowest cost motion vector from among the motion vector locations searched along line 2015. Once the first cross over point 1810 and the second cross over point 2010 have been determined, one of the cross over points can be selected as the preferred cross over point.

To select the preferred cross over point, a cost associated with each of the cross over points 1810 and 2010 may be compared with each other, and the cross over point having the lowest cost may be selected as the preferred cross over point. For example, the cross over point selector 510 (of FIG. 5) may select the lowest cost cross over point. In the example shown in FIGS. 20 and 21, cross over point 1810 is selected as the preferred cross over point because the motion vector associated with cross over point 1810 has a lower cost than the motion vector associated with cross over point 2010. Once the preferred cross over point (e.g., 1810) has been selected, the process can proceed with selecting the best motion vectors plane as will now be described with reference to FIG. 21.

Figure 21:
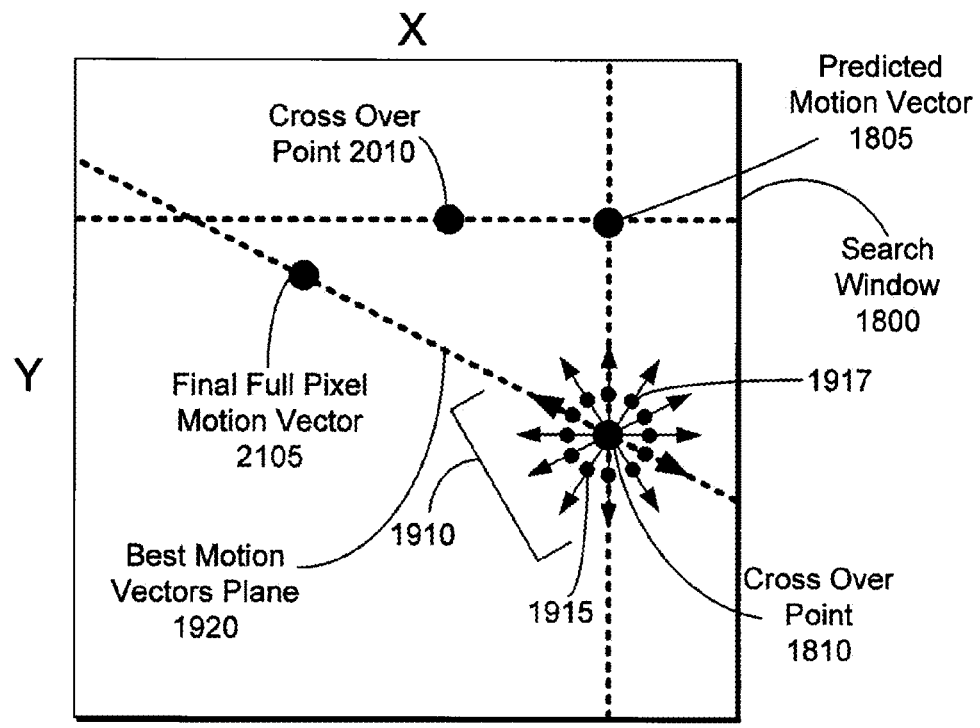
FIG. 21 is a block diagram of the search window of FIG. 20 including a final motion vector.

FIG. 21 is a block diagram of the search window 1800 of FIG. 20 including a final motion vector 2105. The procedure for determining the final motion vector 2105 with reference to FIG. 21 is substantially similar to that described above with reference to FIG. 19, and therefore, for the sake of brevity, such a detailed description will be omitted. It should be understood, however, that determining the best motion vectors plane 1920 proceeds in relation to the preferred cross over point (e.g., cross over point 1810), not the second cross over point 2010 because the cost of the motion vector at cross over point 1810 is less than the cross over point 2010. For example, a cost may be generated with each of a predefined number of sample motion vectors (e.g., 1915 and 1917) about the preferred cross over point (e.g., cross over point 1810), and the direction of the motion vectors plane 1920 can be determined as previously explained.

However, as shown in FIGS. 8 and 9, for example, the various mountain ranges representing the cost distributions vary, and can be oriented differently. As a result, under certain circumstances, the second cross over point 2010 can result in the lowest cost among the two cross over points rather than the first cross over point 1810. Under this scenario, the best motion vectors plane 1920 would be determined accordingly, and the search for the final motion vector 2105 would correspond to the best motion vectors plane 1920, which would correspond to the second cross over point 2010.

Figure 22:
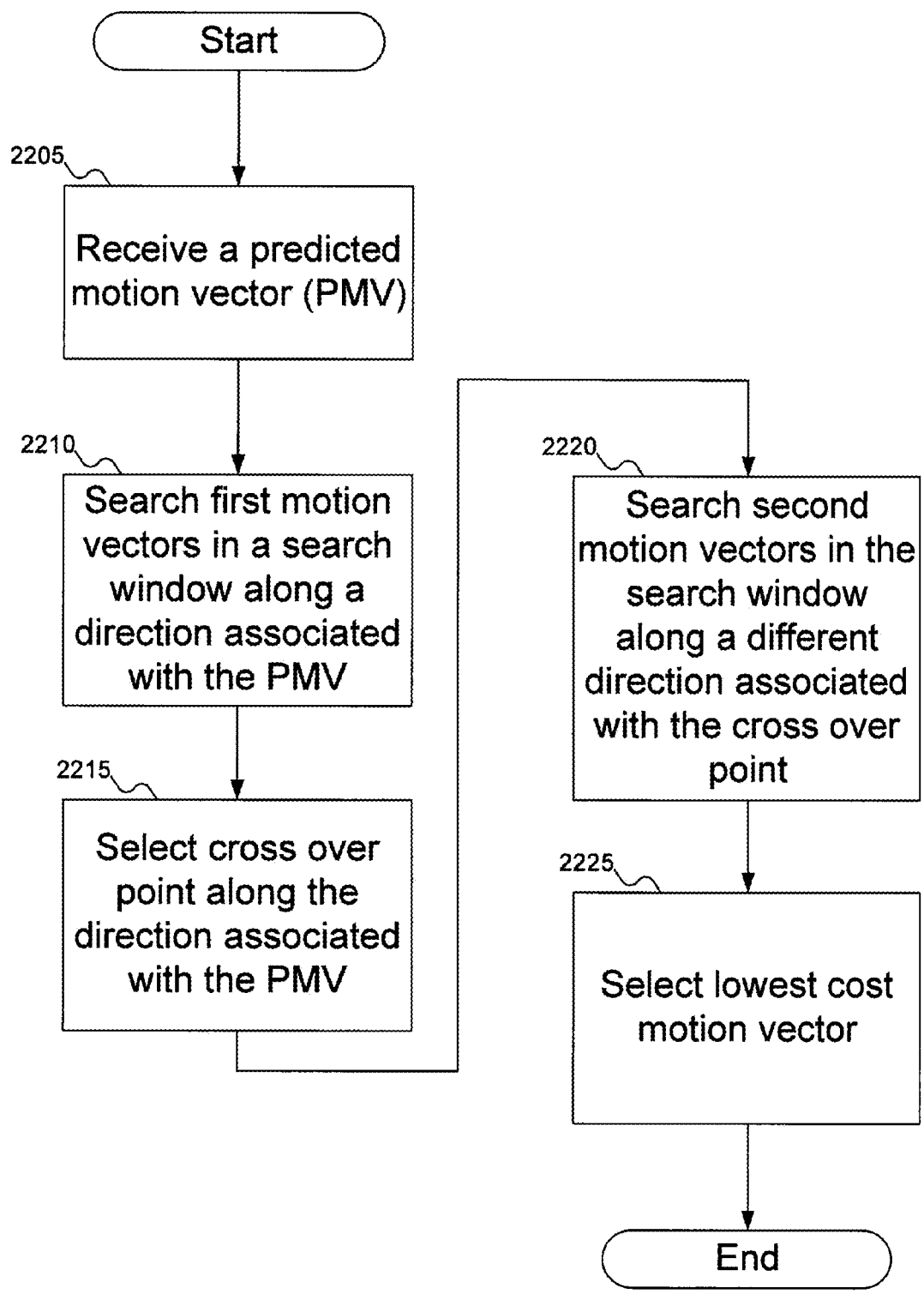
FIG. 22 is a flow diagram illustrating an example process for determining a lowest cost motion vector according to embodiments of the invention.

FIG. 22 is a flow diagram illustrating an example process for determining a lowest cost motion vector according to embodiments of the invention. The flow diagram first includes receiving a predicted motion vector (PMV) at 2205. For example, the motion vector selector 505 (FIG. 5) may receive a predicted motion vector from the predicted motion vector generation unit 530. Next, in a procedure 2210, first motion vectors may be searched in a search window along a first direction associated with the PMV. The first motion vectors may have a fixed coordinate in a second direction. At 2215, a cross over point associated with a lowest cost motion vector from among the first motion vectors along the first direction is selected. The flow proceeds to a procedure 2220 whereupon second motion vectors may be searched in the search window along a third direction different from the first direction, and associated with the cross over point. At 2225, a lowest cost motion vector from among the second motion vectors is selected as the final motion vector.

Figure 23:
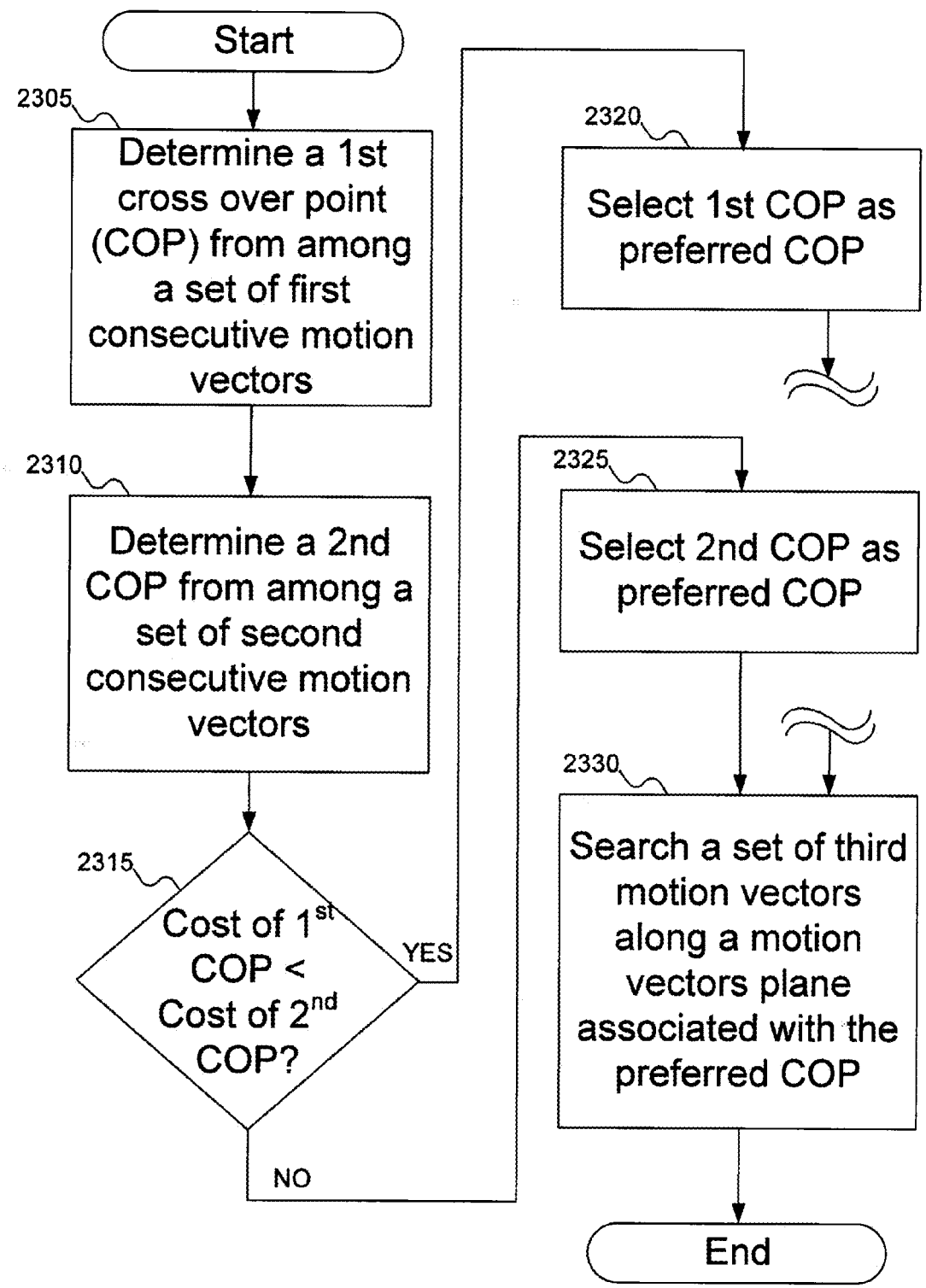
FIG. 23 is a flow diagram illustrating an example process for selecting a preferred cross over point according to embodiments of the invention.

FIG. 23 is a flow diagram illustrating an example process for selecting a preferred cross over point according to other embodiments of the invention. The flow diagram first includes at 2305 determining a first cross over point from among a set of first consecutive motion vectors. The first cross over point may be associated with a lowest cost motion vector from among the set. The set of first consecutive motion vectors may have a common direction coordinate. For example, the set of first consecutive motion vectors may each have a common X coordinate within a search window. Alternatively, the set of first consecutive motion vectors may each have a common Y coordinate within the search window.

At 2310, a second cross over point is determined from among a set of second consecutive motion vectors. The second cross over point may be associated with a lowest cost motion vector from among the set of second consecutive motion vectors. The set of second consecutive motion vectors may have a common direction coordinate. For example, the set of second consecutive motion vectors may each have a common X coordinate within a search window. Alternatively, the set of second consecutive motion vectors may each have a common Y coordinate within the search window.

Next, the procedure may proceed to 2315 to determine whether a cost associated with the first cross over point is less than a cost associated with the second cross over point. Based on this comparison, one of the first or second cross over points is selected as the preferred cross over point at 2320 or 2325. In either case, the flow proceeds to 2330 to search a set of third motion vectors along a motion vectors plane associated with the preferred cross over point. The searching of the set of third motion vectors may yield the lowest cost motion vector for the search window.

Figure 24:
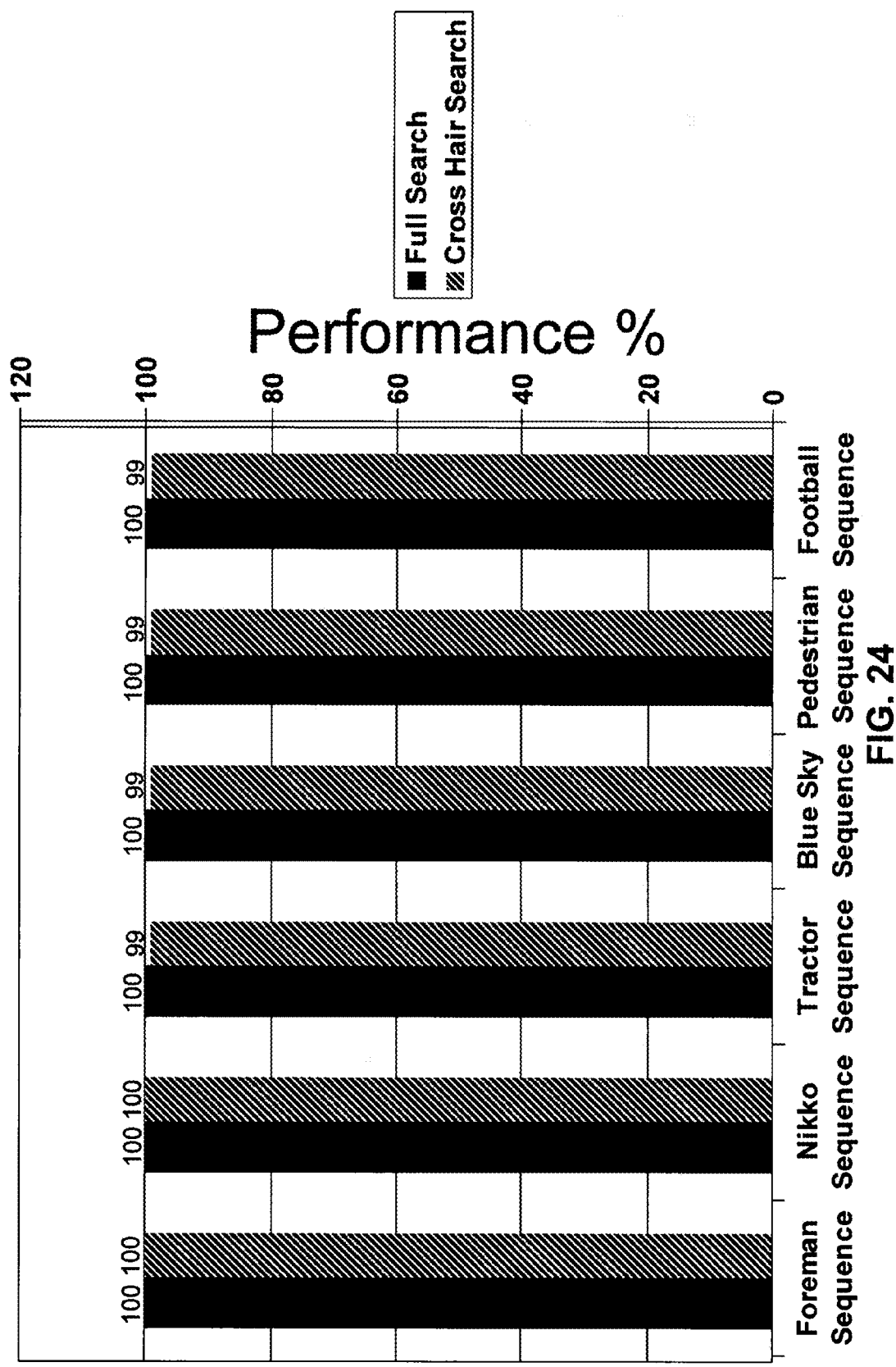
FIG. 24 is a chart showing relative performance of a full search compared to a cross hair search for various video sequences according to embodiments of the invention.

FIG. 24 is a chart showing relative performance of a full search compared to a cross hair search for various video sequence according to embodiments of the invention. The chart shows relative performance for the following video sequences, which are well known to those having skill in the art: Foreman Sequence, Nikko Sequence, Tractor Sequence, Blue Sky Sequence, Pedestrian Sequence, and Football Sequence. These are representative of the similarity of performance results of the cross hair search, as described in the various embodiments above, to a full search.

From the foregoing it will be appreciated that, although specific embodiments of the invention have been described herein for purposes of illustration, various modifications may be made without deviating from the spirit and scope of the invention.

More specifically, although the embodiments described above include searching consecutive motion vectors in various directions to find the lowest cost motion vector, the searches need not be performed consecutively, nor in a straight line. As an example, every other motion vector location could be searched along a general direction. Other similar or non-similar modifications can be made without deviating from the intended scope of the invention. Accordingly, the invention is not limited except as by the appended claims.

What is claimed is:

1. A method of selecting a preferred motion vector, comprising:
    generating a cost associated with each of a first plurality of motion vectors along a first direction;
    determining a cross over point associated with a lowest cost motion vector from among the first plurality of motion vectors;
    determining a motion vector plane associated with the cross over point;
    generating a cost associated with each of a predefined number of sample motion vectors about the cross over point;
    generating a cost associated with each of a second plurality of motion vectors along a second direction associated with the motion vector plane;
    determining an orientation of the second direction associated with the motion vector plane based on the generated costs; and
    selecting a lowest cost motion vector from among the second plurality of motion vectors.

2. A method of selecting a preferred motion vector according to claim 1 in which generating the cost associated with the predefined number of sample motion vectors includes generating the cost of at least one sample motion vector in each of a predefined number of directions extending from the cross over point.

3. A method of selecting a preferred motion vector according to claim 2 in which determining the orientation of the second direction associated with the motion vector plane includes selecting a lowest cost orientation corresponding to at least one of the predefined number of directions extending from the cross over point.

4. A method of selecting a preferred motion vector according to claim 3 in which selecting the lowest cost orientation includes:
    summing costs of the at least one sample motion vector for each of a plurality of opposite directional pairs extending from the cross over point; and
    comparing the summed costs for each pair to each other.

* * * * *